US012030320B2

(12) United States Patent
Okumura et al.

(10) Patent No.: US 12,030,320 B2
(45) Date of Patent: Jul. 9, 2024

(54) LIQUID DISCHARGING DEVICE

(71) Applicant: BROTHER KOGYO KABUSHIKI KAISHA, Nagoya (JP)

(72) Inventors: Yuki Okumura, Iwakura (JP); Misaki Takeuchi, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/425,078

(22) Filed: Jan. 29, 2024

(65) Prior Publication Data

US 2024/0165959 A1 May 23, 2024

Related U.S. Application Data

(63) Continuation of application No. 18/191,914, filed on Mar. 29, 2023, now abandoned.

(30) Foreign Application Priority Data

Mar. 31, 2022 (JP) ................................ 2022-061285
Mar. 14, 2023 (JP) ................................ 2023-039425

(51) Int. Cl.
*B41J 2/18* (2006.01)

(52) U.S. Cl.
CPC ...................................... *B41J 2/18* (2013.01)

(58) Field of Classification Search
CPC . B41J 29/02; B41J 2/175; B41J 2/1752; B41J 2/18; B41J 2/17546; B41J 29/13
See application file for complete search history.

(56) References Cited

U.S. PATENT DOCUMENTS 8,201,934 B2 6/2012 Kawakami et al.
10,399,342 B2 9/2019 Nakamura et al.
(Continued)

FOREIGN PATENT DOCUMENTS

JP 2002192751 A 7/2002
JP 2007130854 A 5/2007
(Continued)

OTHER PUBLICATIONS

Office Action issued Feb. 20, 2024 in corresponding Japanese Patent Application No. 2023-039425 (with machine English translation), 7 pages.

(Continued)

*Primary Examiner* — An H Do
(74) *Attorney, Agent, or Firm* — Element IP, PLC

(57) ABSTRACT

A liquid discharging device includes: a cartridge mounting part; a tank connected to the cartridge mounting part; a head that ejects a liquid; a discharge configured to discharge the liquid from the head; and a controller. The liquid is at least a storage liquid, a first liquid which is different from the storage liquid, or a mixture thereof. In a storage mode, the controller executes: a return process of returning the first liquid from the tank to a first liquid cartridge mounted on the cartridge mounting part; a first discharging process of discharging the first liquid from the head; a storage liquid supplying process for supplying a storage liquid from a storage liquid cartridge to the tank; and a second discharging process of discharging the storage liquid from the head, after executing the storage liquid supplying process.

20 Claims, 18 Drawing Sheets

(56) References Cited

U.S. PATENT DOCUMENTS

| | | | | |
|---|---|---|---|---|
| 10,668,731 | B2 * | 6/2020 | Ueda | B41J 2/175 |
| 10,752,005 | B2 * | 8/2020 | Shimizu | B41J 2/19 |
| 10,875,309 | B2 | 12/2020 | Arimura et al. | |
| 11,427,004 | B2 * | 8/2022 | Tanaka | B41J 2/16547 |
| 11,491,793 | B2 | 11/2022 | Hamamoto | |
| 2014/0085376 | A1 | 3/2014 | Kato et al. | |
| 2016/0089889 | A1 | 3/2016 | Kawashima | |
| 2022/0040979 | A1 | 2/2022 | Takanashi et al. | |

FOREIGN PATENT DOCUMENTS

| | | | |
|---|---|---|---|
| JP | 2009034876 | A | 2/2009 |
| JP | 2016068314 | A | 5/2016 |
| JP | 2016179615 | A | 10/2016 |
| JP | 2017056651 | A | 3/2017 |
| JP | 2017190374 | A | 10/2017 |
| JP | 2018150495 | A | 9/2018 |

OTHER PUBLICATIONS

Extended European Search Report issued Mar. 7, 2024 in corresponding European Patent Application No. 23200579.3, 10 pages.

Final Office Action issued Apr. 30, 2024 in corresponding Japanese Patent Application No. 2023-039425 (with machine English translation), 6 pages.

* cited by examiner

LIQUID DISCHARGING DEVICE

CROSS-REFERENCE TO RELATED APPLICATIONS

The present application is a continuation application of U.S. patent application Ser. No. 18/191,914, filed Mar. 29, 2023, which claims priority to Japanese Patent Application No. 2022-061285 filed Mar. 31, 2022, and to Japanese Patent Application No. 2023-039425 filed Mar. 14, 2023. The contents of these applications are incorporated herein by reference in their entirety.

BACKGROUND

The present disclosure relates to a liquid discharging device.

The inkjet recording device is known as a liquid ejecting device that ejects liquid from nozzles of a head and prints on a sheet, for example. Some of the inkjet recording devices have a maintenance liquid tank, and cleans the inside of the head using the maintenance liquid.

SUMMARY

According to an aspect of the present disclosure, A liquid discharging device, includes: a cartridge mounting part configured to have a cartridge retaining a liquid mounted thereon; a tank configured to retain the liquid; a head configured to eject the liquid from a nozzle which is an opening provided on a nozzle surface of the head; a first channel connecting the cartridge mounting part and the tank; a second channel connecting the tank and the head; a discharge unit including a cap configured to cover the nozzle surface, the discharge unit being configured to discharge the liquid from the nozzle by creating a negative pressure in an internal space of the cap; and a controller. The liquid is at least a storage liquid, a first liquid which is different from the storage liquid, or a mixture thereof. The cartridge includes a first liquid cartridge which retains the first liquid and a storage liquid cartridge which retains the storage liquid. In a state where the liquid discharging device is in a storage mode, the controller executes: a return process in which the first liquid is returned from the tank through the first channel to the first liquid cartridge mounted on the cartridge mounting part; a first discharging process in which the first liquid is discharged from the head after executing the return process by an operation of the discharge unit; a storage liquid supplying process in which the storage liquid is supplied from a storage liquid cartridge to the tank in a state where the storage liquid cartridge is mounted on the cartridge mounting part; and a second discharging process in which the storage liquid is discharged from the head after executing the storage liquid supplying process by an operation of the discharge unit.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION

Figure 1:
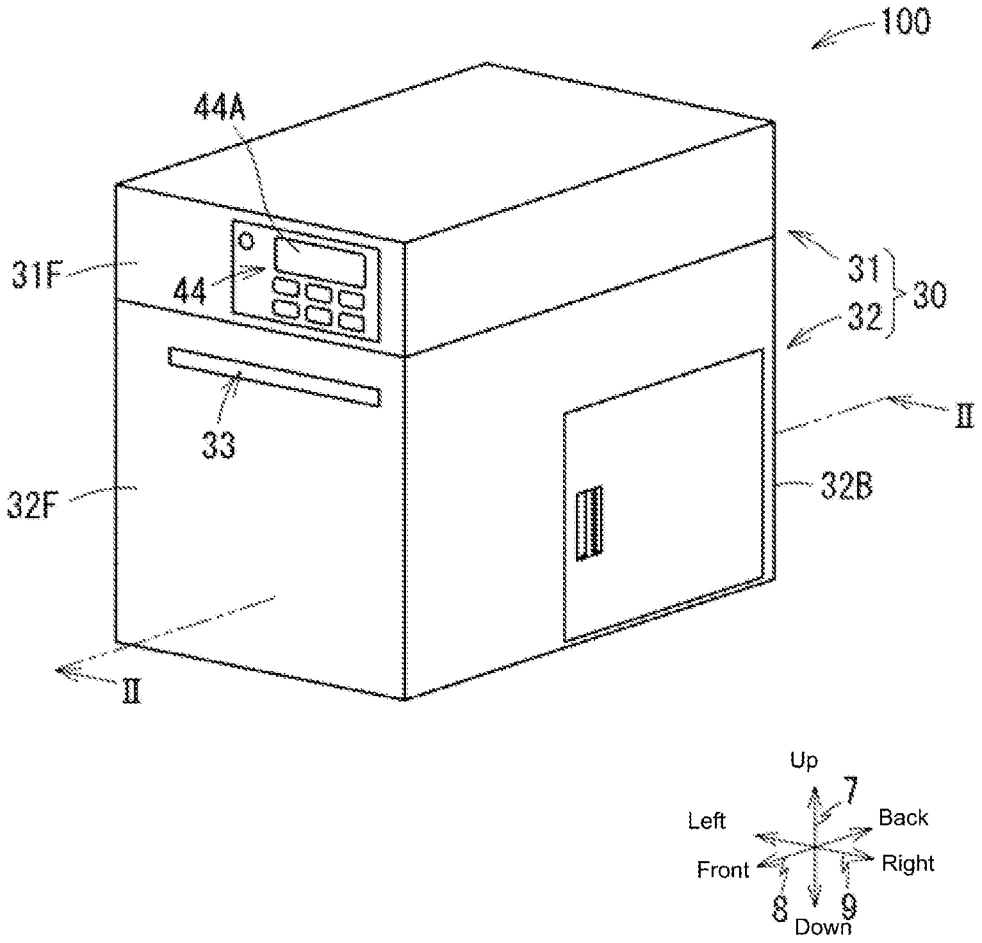
FIG. 1 is an appearance perspective view of an image recording device 100 according to an Embodiment of the present disclosure.

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

In some known devices, the inside of the head is cleaned with maintenance liquid when the head is not used for a certain period of time. For example, an industrial inkjet recording device routinely prints on a large number of recording media, and therefore, it is desired to improve the printing speed and lengthen the continuous printing period without exchanging cartridges. In order to meet such demands, the capacity of the ink tank is increased and the size of the head is increased. As a result, the amount of ink remaining in the head and channel increases, the amount of ink discarded during storage increases, and a large amount of maintenance liquid is required to clean the head and channel.

(1) The liquid discharging device according to the present disclosure includes a cartridge mounting part to which a cartridge for retaining liquid is mounted, a tank connected to the cartridge mounting part by a first channel, a head that ejects liquid from a nozzle which is an opening on the nozzle surface; a second channel that supplies liquid from the tank to the head, a discharge mechanism (discharge unit) for discharging the liquid from the head, and a controller. The liquid is at least a storage liquid, a first liquid which is different from the storage liquid, or a mixture thereof. The cartridge includes a first liquid cartridge which retains the first liquid and a storage liquid cartridge which retains the storage liquid. In a state where the liquid discharging device is in a storage mode, the controller executes:

- return processing of returning the first liquid from the tank through the first channel to the first liquid cartridge mounted on the cartridge mounting part, under the condition that the device is transferred to a storage state;
- a first discharging process of driving the discharge mechanism to discharge the first liquid from the head, after executing the return processing;
- a storage liquid supplying process of supplying the storage liquid from the storage liquid cartridge to the tank in a state where the storage liquid cartridge is mounted on the cartridge mounting part; and
- a second discharging process of driving the discharge mechanism to discharge the storage liquid from the head after executing the storage liquid supplying.

The liquid in the head, tank, first channel, and second channel can be replaced with the storage liquid. In addition, the liquid inside the tank is returned to the first cartridge in the return process; therefore, the amount of liquid wasted when storing is low. In addition, the liquid in the head, first channel, and second channel is easily replaced with storage liquid.

(2) The controller may further cause the liquid discharging device to transition to the storage mode based on an instruction command received while the first liquid cartridge is mounted on the cartridge mounting part.

Since the user can input an instruction command to the device at any timing, the liquid discharging device can be placed into storage mode based on the schedule of use of the user.

(3) The first liquid may contain a coloring agent, an organic solvent, a surfactant, and water; and the storage liquid may contain an organic solvent, a surfactant, and water.

(4) The liquid further may include a resin microparticle, and the coloring agent includes a pigment; and the storage liquid may further include a water-soluble polymer.

The liquid with excellent fast drying properties on the recording medium has excellent replacement properties for being replaced with the storage liquid, and redispersibility for dissolving solidified liquid is also excellent.

(5) A viscosity of the first liquid is preferably higher than a viscosity of the storage liquid.

(6) The surfactant contained in the storage liquid is preferably an anionic surfactant.

(7) A weight average molecular weight of the water-soluble polymer contained in the storage liquid is preferably within a range of 8,500 to 20,000.

(8) The water-soluble polymer included in the storage liquid preferably contains an aromatic alkyl group or lactam group in a structure thereof.

(9) The organic solvent contained in the first liquid preferably includes a glycol ether having a propylene oxide group and the organic solvent contained in the storage liquid preferably includes a glycol ether having an ethylene oxide group.

(10) The organic solvents contained in the first liquid may include a low-solidification-temperature organic solvent which is independently in a liquid state at 25° C., in an amount of 10% by weight or less of a total liquid amount.

(11) The resin microparticle contained in the first liquid is preferably an acrylic resin.

(12) With the return process, the controller may determine whether or not the first liquid cartridge is mounted on the cartridge mounting part based on whether or not identification information is received from the first liquid cartridge.

(13) The liquid discharging device may also include a third channel for discharging liquid from the head to the tank; and the controller may further execute a storage liquid circulation process that circulates the storage liquid retained in the tank through the second channel and the third channel to and from the head before the second discharging process.

(14) The controller may further execute a first liquid circulation process of circulating the first liquid retained in the tank between the tank and the head through the second channel and the third channel, in a state where the first liquid cartridge is mounted on the cartridge mounting part.

(15) The controller may repeatedly execute the storage liquid circulation process and the second discharging process.

(16) During the storage liquid supplying process, the controller may determine whether or not the storage liquid cartridge is mounted on the cartridge mounting part based on whether or not identification information is received from the storage liquid cartridge.

(17) The discharge mechanism may include: a cap configured to abut against the nozzle surface in a covering position and to separate from the nozzle surface in a retracted position, and a fourth channel communicating with an internal space of the cap. The controller may further execute a cleaning process of circulating a cleaning liquid in the internal space of the cap and in the fourth channel.

(18) The controller may further record storage information indicating being in a storage state in a memory, and then may turn a power of the liquid discharging device OFF, after executing the second discharging process.

(19) The controller may further drive the discharge mechanism to discharge the storage liquid from the head, in a state where the storage information is recorded in the memory and the first liquid cartridge is mounted on the cartridge mounting part.

(20) The controller may further supply the first liquid from the first liquid cartridge to the tank, in a state where the storage information is recorded in the memory and the first liquid cartridge is mounted on the cartridge mounting part.

The present disclosure facilitates appropriately handling ink remaining in a liquid discharging device when the liquid discharging device is placed in a storage state, and facilitates the replacement with storage liquid.

Preferred Embodiments of the present disclosure will be described below. Note that the present Embodiment naturally is merely one Embodiment of the present disclosure, and that the Embodiment can be changed to an extent that the gist of the present disclosure is not altered. In the following description, the vertical direction 7 is defined based on the state in which the image recording device 100 is installed for use (the state in FIG. 1), the front-to-back direction 8 is defined with the side on which the discharge port 33 is provided as the close side (front side), and the left-right direction 9 is defined as viewed from the close side (front) of the image recording device 100.

[External Configuration of Image Recording Device 100]

An image recording device 100 (an example of a liquid discharging device) illustrated in FIG. 1 records an image on a sheet S forming a rolled body 37 (see FIG. 2) by an inkjet recording method.

As illustrated in FIG. 1, the image recording device 100 includes a housing 30. The housing 30 has an upper housing 31 and a lower housing 32. The upper housing 31 and the lower housing 32 are generally a rectangular body as a whole, and are large enough to be placed on a desk. In other words, the image recording device 100 is suitable for use while being placed on a desk. Of course, the image recording device 100 may be placed on the floor or on a rack for use.

Figure 2:
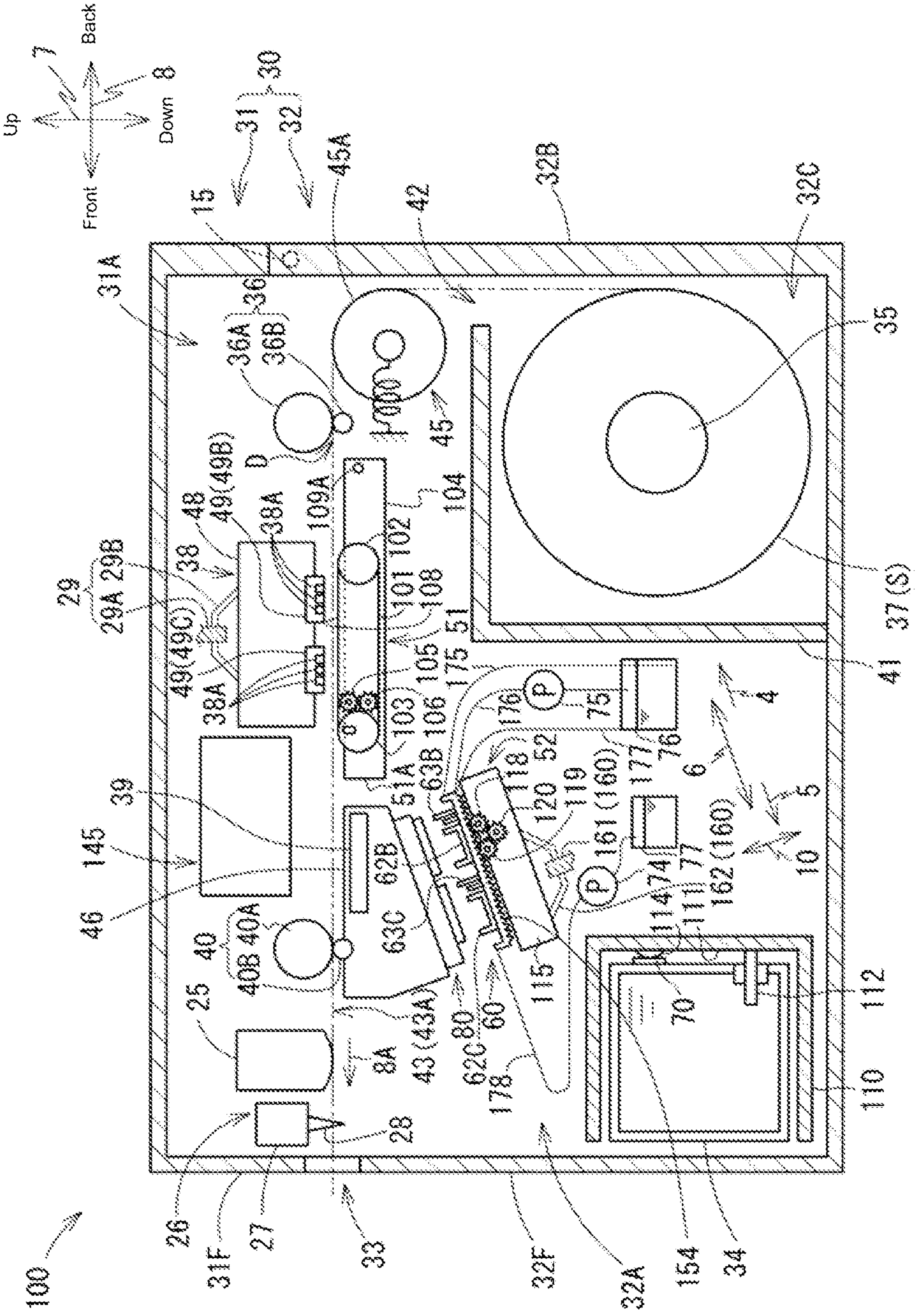
FIG. 2 is a cross-sectional view illustrating the II-II cross section of FIG. 1, indicating a state in which the head 38 is at a recording position, the first support mechanism 51 is at a first orientation, and the maintenance mechanism 60 is at a standby position.

As illustrated in FIG. 2, the housing 30 is divided into an internal space 31A inside the upper housing 31 and an internal space 32A inside the lower housing 32, as seen from the outside.

Figure 3:
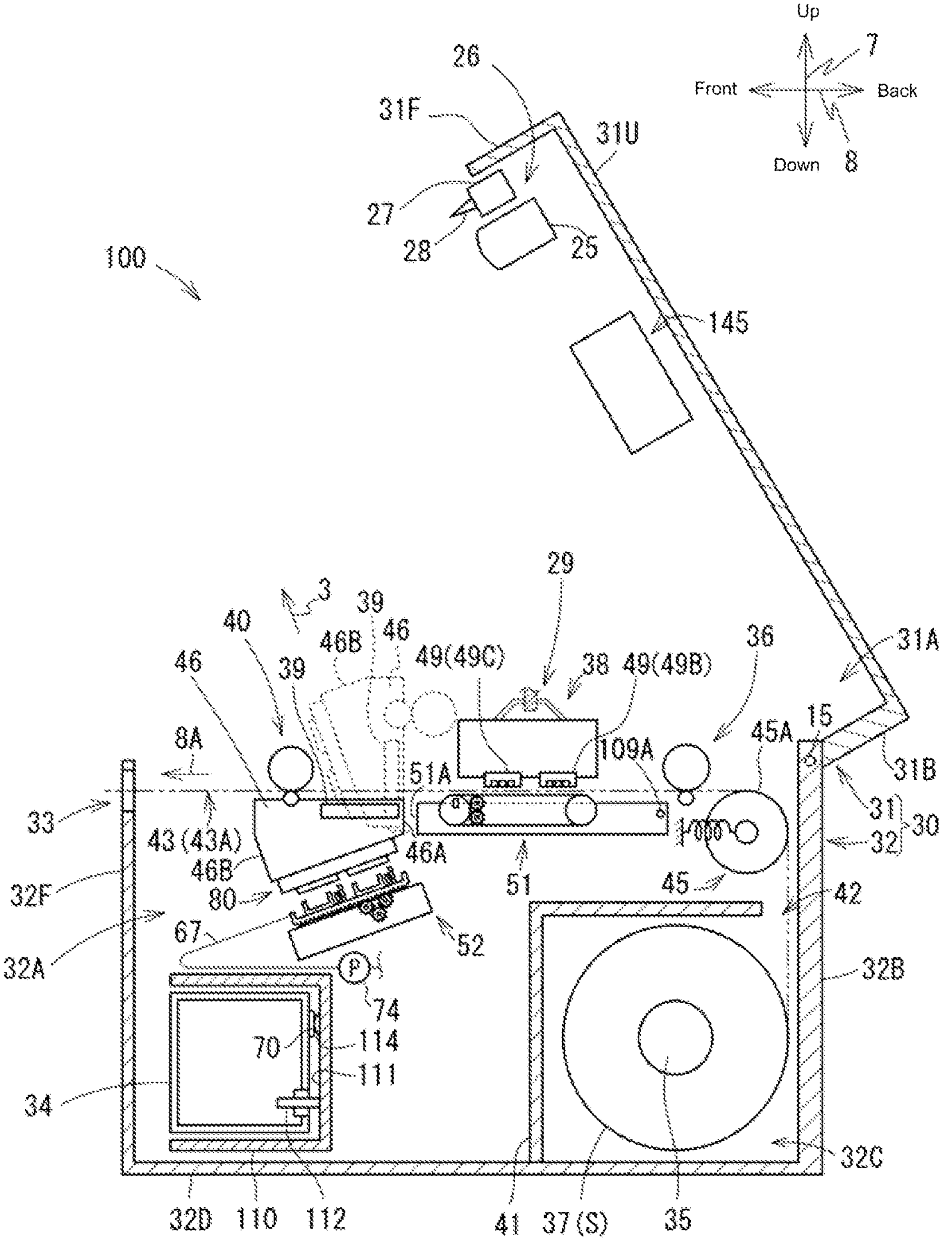
FIG. 3 is a cross-sectional view illustrating a state in which the upper housing 31 in FIG. 2 is in an open position.

As illustrated in FIGS. 2 and 3, the upper housing 31 is rotatably supported by the lower housing 32. The upper housing 31 is rotatable around a rotation shaft 15 that is provided on a rear lower end part and extends in the left-right direction 9 between a closed position illustrated in FIG. 2 and an open position illustrated in FIG. 3.

As illustrated in FIG. 1, a slit-shaped discharge port 33 elongated in the left-right direction 9 is formed in the front surface 32F of the lower housing 32. A sheet S on which an image has been recorded (see FIG. 2) is discharged from the discharge port 33.

An operating panel 44 is provided on the front surface 31F of the upper housing 31. The user provides inputs to the operating panel 44 to operate the image recording device 100 and confirms various settings. The operating panel 44 has a display part 44A for indicating that a cover member 82, which will be described later, is mounted on the support member 81.

[Internal Configuration of Image Recording Device 100]

Figure 10:
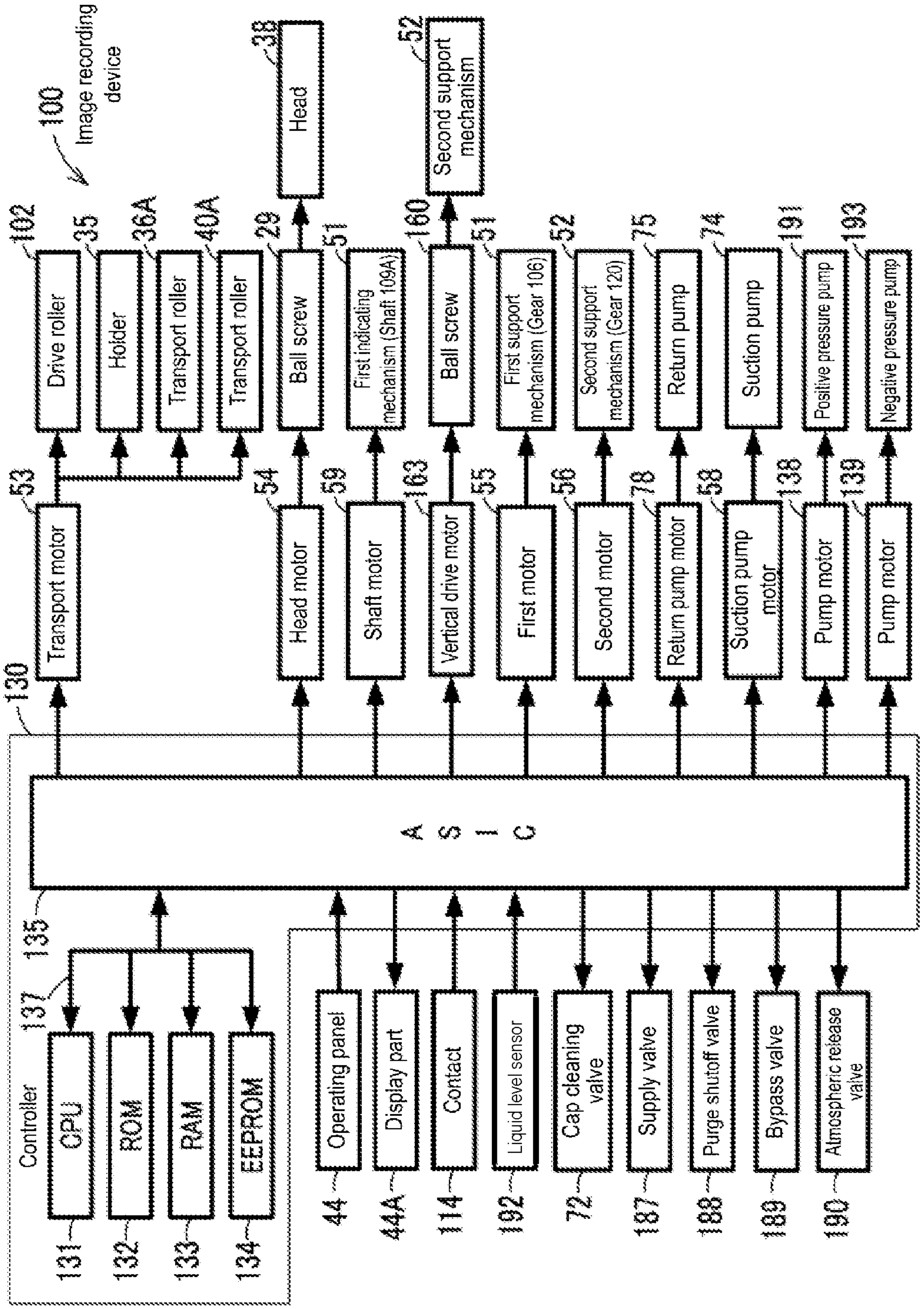
FIG. 10 is a block diagram of an image recording device 100.

As illustrated in FIG. 2, the internal spaces 31A and 32A include a holder 35, a tensioner 45, a transport roller pair 36, a transport roller pair 40, a head 38, a first support mechanism 51, a heater 39, a support part 46, a second support mechanism 52, CIS 25, a cutter unit 26, an ink tank 34, a cleaning liquid tank 76, a waste liquid tank 77, a maintenance mechanism 60, a wiper cleaning mechanism 80, and a controller 130 (see FIG. 10). Although not illustrated in FIG. 2, the controller 130 is provided in the internal space 32A. The controller 130 controls operation of the image recording device 100.

A partition wall 41 is provided in the internal space 32A. The partition wall 41 partitions the rear lower portion of the internal space 32A to define the sheet storage space 32C. The sheet storage space 32C is enclosed by the partition wall 41 and the lower housing 32.

A roll body 37 is stored in the sheet storage space 32C. The roll body 37 has a core tube and a long sheet S. The sheet S is wound around the core tube in a roll shape in the circumferential direction of the axis of the core tube.

As illustrated in FIG. 2, a holder 35 extending in the left-right direction 9 is positioned in the sheet storage space 32C. When mounted, the holder 35 supports the roll body 37 so that the axis of the core tube of the roll body 37 is in the left-right direction 9 and the roll body 37 is rotatable around the axis in the circumferential direction. The holder 35 is rotated by a driving force transmitted from a transport motor 53 (see FIG. 10). As the holder 35 rotates, the roll body 37 supported by the holder 35 also rotates.

As illustrated in FIG. 2, the sheet storage space 32C opens upward at a rear portion. A gap 42 is formed between the partition wall 41 and the rear surface 32B, that is, above a rear end of the roll body 37. As the transport roller pairs 36 and 40 rotate, the sheet S is drawn upward from the rear end of the roll body 37 and guided to the tensioner 45 through the gap 42.

The tensioner 45 is positioned above the partition wall 41 in the rear portion of the internal space 32A. The tensioner 45 has an outer peripheral surface 45A facing the outside of the lower housing 32. The upper end of the outer peripheral surface 45A is located at substantially the same vertical position as a nip D of the transport roller pair 36 in the vertical direction 7.

The sheet S pulled out from the roll body 37 is caught on and abuts against the outer peripheral surface 45A. The sheet S curves forward along the outer peripheral surface 45A, extends in the transport direction 8A, and is guided by the transport roller pair 36. The transport direction 8A is forward along the front-to-back direction 8.

The transport roller pair 36 is positioned in front of the tensioner 45. The transport roller pair 36 has a transport roller 36A and a pinch roller 36B. The transport roller 36A and the pinch roller 36B form a nip D by contacting each other at substantially the same vertical position as the upper end of the outer peripheral surface 45A.

A transport roller pair 40 is positioned in front of the transport roller pair 36. The transport roller pair 40 has a transport roller 40A and a pinch roller 40B. The transport roller 40A and the pinch roller 40B contact each other at substantially the same vertical position as the upper end of the outer peripheral surface 45A to form a nip.

The transport rollers 36A, 40A are rotated by a driving force transmitted from the transport motor 53 (see FIG. 10). The transport roller pair 36 nips and rotates the sheet S extending from the tensioner 45 in the transport direction 8A, thereby feeding the sheet S along the transport surface 43A of the transport path 43, described below, in the transport direction 8A. The transport roller pair 40 nips and rotates the sheet S fed from the transport roller pair 36 to feed the sheet S in the transport direction 8A. Furthermore, the sheet S is pulled out from the sheet storage space 32C toward the tensioner 45 through the gap 42 due to the rotation of the transport roller pairs 36 and 40.

As illustrated in FIG. 2, a transport path 43 extending from the upper end of the outer peripheral surface 45A to the discharge port 33 is formed in the internal space 32A. The transport path 43 extends substantially linearly along the transport direction 8A, and is a space through which the sheet S can pass. Specifically, the transport path 43 extends along the transport surface 43A extending in the transport direction 8A and the left-right direction 9 and being long in the transport direction 8A. In addition, in FIG. 2, the transport surface 43A is indicated by a two-dot chain line indicating the transport path 43. The transport path 43 is partitioned by guide members which are spaced apart in the vertical direction 7 (not illustrated), a head 38, a transport belt 101, a support part 46, a heater 39, and the like. In other words, the head 38, the transport belt 101, the supporting part 46, and the heater 39 are positioned along the transport path 43.

The head 38 is located above the transport path 43 and downstream of the transport roller pair 36 in the transport direction 8A. The head 38 has a plurality of nozzles 38A that open on a nozzle surface 50 (see FIG. 4A). Ink is ejected downward from the plurality of nozzles 38A toward the sheet S supported by the transport belt 101. Thus, an image is recorded on the sheet S. The configuration of the head 38 will be described later.

The first support mechanism 51 is positioned downstream of the transport roller pair 36 in the transport direction 8A and below the transport path 43. The first support mechanism 51 faces the head 38 and is below the head 38. The first support mechanism 51 has a transport belt 101 and a support member 104. The transport belt 101 supports the sheet S which is transported in the transport direction 8A by the transport roller pair 36 and positioned immediately below the head 38. The transport belt 101 transports the supported sheet S in the transport direction 8A. The support member 104 can support the maintenance mechanism 60.

The first support mechanism 51 includes a transport belt 101, a drive roller 102, a driven roller 103, a support member 104, and gears 105 and 106. Note that the teeth of the gears 105 and 106 are omitted in each figure.

The drive roller 102 and the driven roller 103 are rotatably supported by a support member 104. The drive roller 102 and the driven roller 103 are separated from each other in the front-to-back direction 8 (transport direction 8A). The transport belt 101 is an endless belt. A transport belt 101 is stretched over the drive roller 102 and the driven roller 103. The transport belt 101 is arranged in the transport path 43 in the left-right direction 9.

The drive roller 102 is rotated by a driving force provided by the transport motor 53 (see FIG. 10) to rotate the transport belt 101. As the transport belt 101 rotates, the driven roller 103 rotates. The transport belt 101 has a transport surface 108. The transport surface 108 is the upper portion of the outer peripheral surface of the transport belt 101 and extends along the transport direction 8A. The transport surface 108 faces the nozzles 38A of the head 38 with the transport path 43 interposed therebetween. The transport surface 108 applies a transport force to the sheet S while supporting the sheet S transported between the pair of transport rollers 36 and 40 from below. As a result, the transport belt 101 transports the sheet S positioned on the transport path 43 in the transport direction 8A along the transport surface 108.

The support member 104 has a shaft 109A. The shaft 109A is rotatably supported by the lower housing 32. The shaft 109A extends in the left-right direction 9 (direction perpendicular to the transport direction 8A and parallel to the nozzle surface 50 of the ejecting module 49). The shaft 109A is provided upstream of the drive roller 102 in the transport direction 8A. The shaft 109A is positioned below the transport roller pair 36.

The shaft 109A is rotated by a driving force transmitted from a shaft motor 59 (see FIG. 10). As the shaft 109A rotates, the support member 104 rotates around the shaft 109A. The pivot tip end 51A of the first support mechanism 51 is positioned downstream in the transport direction 8A from the shaft 109A.

The support member 104 has a first orientation parallel to the nozzle surface 50 of the ejecting module 49 (see FIG. 2), and a second orientation which is angled around the shaft 109A as the center from the first orientation, and a pivot tip end 51A is located below the shaft 109 (see FIG. 13), such that the orientation can be altered.

As illustrated in FIG. 2, the transport surface 108 of the transport belt 101 extends along the front-to-back direction 8 when the first support mechanism 51 is in the first orientation. As a result, the transport belt 101 can transport the sheet S positioned on the transport path 43 forward to the support part 46.

Figure 13:
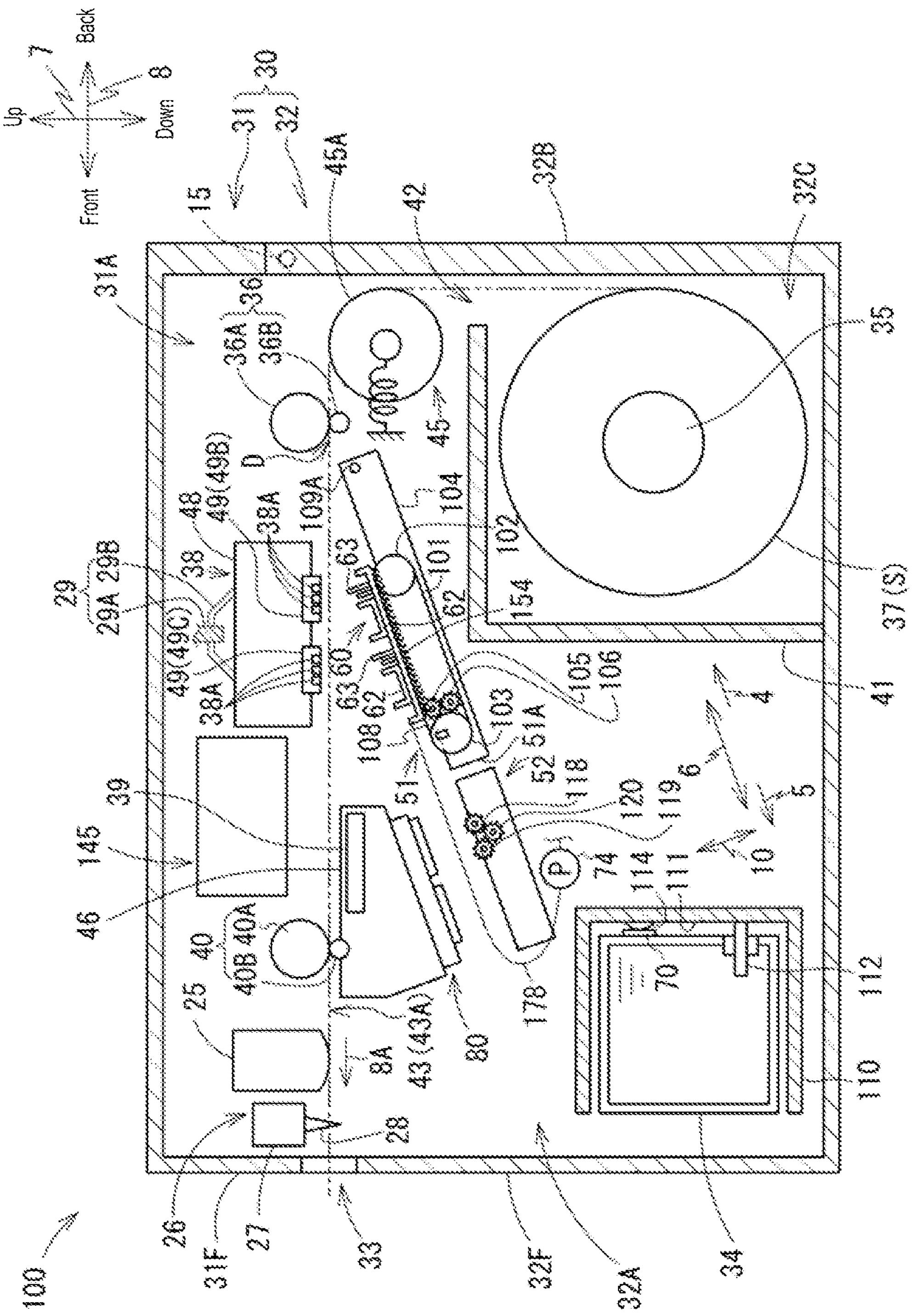
FIG. 13 is a cross-sectional view illustrating the II-II cross section of FIG. 1, indicating a state in which the head 38 is at a recording position, the first support mechanism 51 is at a second orientation, and the maintenance mechanism 60 is at a position supported by the first support mechanism 51.

As illustrated in FIG. 13, when the first support mechanism 51 is in the second orientation, the transport surface 108 of the transport belt 101 extends along a downward sloping direction 6 toward the front. The sloping direction 6 is perpendicular to the left-right direction 9 and intersects the transport direction 8A.

As illustrated in FIG. 2, gears 105 and 106 are rotatably supported by the support member 104 of first support mechanism 51. The gear 106 is connected to the first motor 55 (see FIG. 10) directly or via another gear or the like, and is provided a driving force from the first motor 55.

The heater 39 is located downstream of the head 38 in the transport direction 8A and upstream of the transport roller pair 40 in the transport direction 8A below the transport path 43. The heater 39 is supported by a frame in front of the first support mechanism 51 and extends in the left-right direction 9. The heater 39 has a heat transfer plate (not illustrated) and a film heater (not illustrated). The heat transfer plate is composed of metal, and has support surfaces extending in the front, rear, left, and right directions at substantially the same vertical positions as the transport surface 108 of the transport belt 101. The sheet S delivered from the first support mechanism 51 is transported forward on the support surface of the heat transfer plate. A film heater is fixed to the lower surface of the heat transfer plate and generates heat as controlled by the controller 130. This heat is transferred to the sheet S on the heat transfer plate via the heat transfer plate. In addition, heat from the heater 39 is recovered by a duct 145 provided above the heater 39.

The duct 145 is provided above the transport path 43, downstream of the head 38 in the transport direction 8A and upstream of the transport roller pair 40.

The support part 46 is positioned below the transport path 43. The support part 46 is located downstream of the head 38 and the first support mechanism 51 in the transport direction 8A. A heater 39 is positioned behind the support part 46. A front portion of the support part 46 faces the transport roller 40A. The support part 46 is located upstream of the cutter unit 26 in the transport direction 8A.

The support part 46 is supported by the lower housing 32 so as to be rotatable about a shaft (not illustrated) extending in the left-right direction 9. As illustrated in FIG. 3, when the upper housing 31 is in the open position, the support part 46 can be rotated between a horizontal position indicated by the solid line in FIG. 3 and the vertical position indicated by the dashed line in FIG. 3.

When the support part 46 is in the horizontal position, the pivot tip end 46B of the support part 46 is positioned forward (downstream in the transport direction 8A) of the pivot base end 46A. When the support part 46 is in the horizontal position, the support part 46 constitutes a portion of the transport path 43 and can support the sheet S transported in the transport direction 8A by the transport belt 101. When the support part 46 is in the vertical position, the pivot tip end 46B of the support part 46 is positioned higher than when the support part 46 is in the horizontal position, such that the maintenance mechanism 60 can be exposed to the outside. The shaft of the support part 46 is provided at the rear end portion of the support part 46 and extends in the left-right direction 9.

The second support mechanism 52 is supported by the lower housing 32 so as to be movable in an orthogonal direction 10 orthogonal to the sloping direction 6 and the left-right direction 9. The second support mechanism 52 can support the maintenance mechanism 60. The second support mechanism 52 is provided so as to extend in the sloping direction 6 as a whole, and can be moved in a direction to contact and separate from the wiper cleaning mechanism 80 by a ball screw (not illustrated). The second support mechanism 52 supports the maintenance mechanism 60 to slidably support the movement of the maintenance mechanism 60.

Gears 118, 119, 120 are rotatably supported by a main body 115 of the second support mechanism 52. Gear 120 meshes with gears 118 and 119. As gear 120 rotates, gears 118 and 119 rotate in the same direction. The gear 120 is connected to the second motor 56 (see FIG. 10) directly or via another gear or the like, and is driven by a driving force from the second motor 56. The gears 118 and 119 can be meshed with a rack 154 of the maintenance mechanism 60 that is positioned across from the gears.

The CIS 25 is positioned above the transport path 43 and downstream of the transport roller pair 40 in the transport direction 8A. The CIS 25 can read an image on a printed surface of a sheet.

The cutter unit 26 is positioned above the transport path 43 and downstream of the CIS 25 in the transport direction 8A. The cutter unit 26 has a cutter 28 mounted on a cutter carriage 27. Movement of the cutter 28 cuts the sheet S positioned on the transport path 43 along the left-right direction 9.

The mounting case 110 (an example of a cartridge mounting part) is positioned near the front and lower ends of the lower housing 32 and has a box shape that opens in the forward direction. An ink tank 34 (an example of a liquid cartridge) is inserted facing backwards into the mounting case 110. An ink needle 112 extending forward is positioned on a rearward end surface 111 of the mounting case 110. The front end of the ink needle 112 is open, and the rear end is connected to an ink circuit 113 (see FIG. 9). The ink circuit 113 connects the internal space of the ink needle 112 and the head 38 such that ink can flow. When the ink tank 34 is attached to the mounting case 110, the ink needle 112 is inserted into the outflow port of the ink tank 34. As a result, ink retained in the ink tank 34 is supplied to the head 38 through the ink needle 112 and the ink circuit 113. The configuration of the ink circuit 113 will be described later. A contact 114 is located on an end surface 111. The contact 114 is electrically connected to an IC substrate 70 of the ink tank 34 when the ink tank 34 is mounted in the mounting case 110. The controller 130 can access the recording region of the IC substrate 70 through the contact 114.

The ink tank 34 retains ink. Ink is a liquid containing pigments and the like. The internal space of the ink tank 34 is a retaining chamber that retains ink. The retaining chamber may be in air communication with the outside, or may be in the form of a bag such as a pouch that can shrink as the ink flows out. Ink is supplied to the head 38 through the ink circuit 113 from the ink tank 34 mounted in the mounting case 110. The IC substrate 70 is positioned behind the ink tank 34. The IC substrate 70 stores identification information in a recording region, indicating that it is the ink tank 34.

Figure 9:
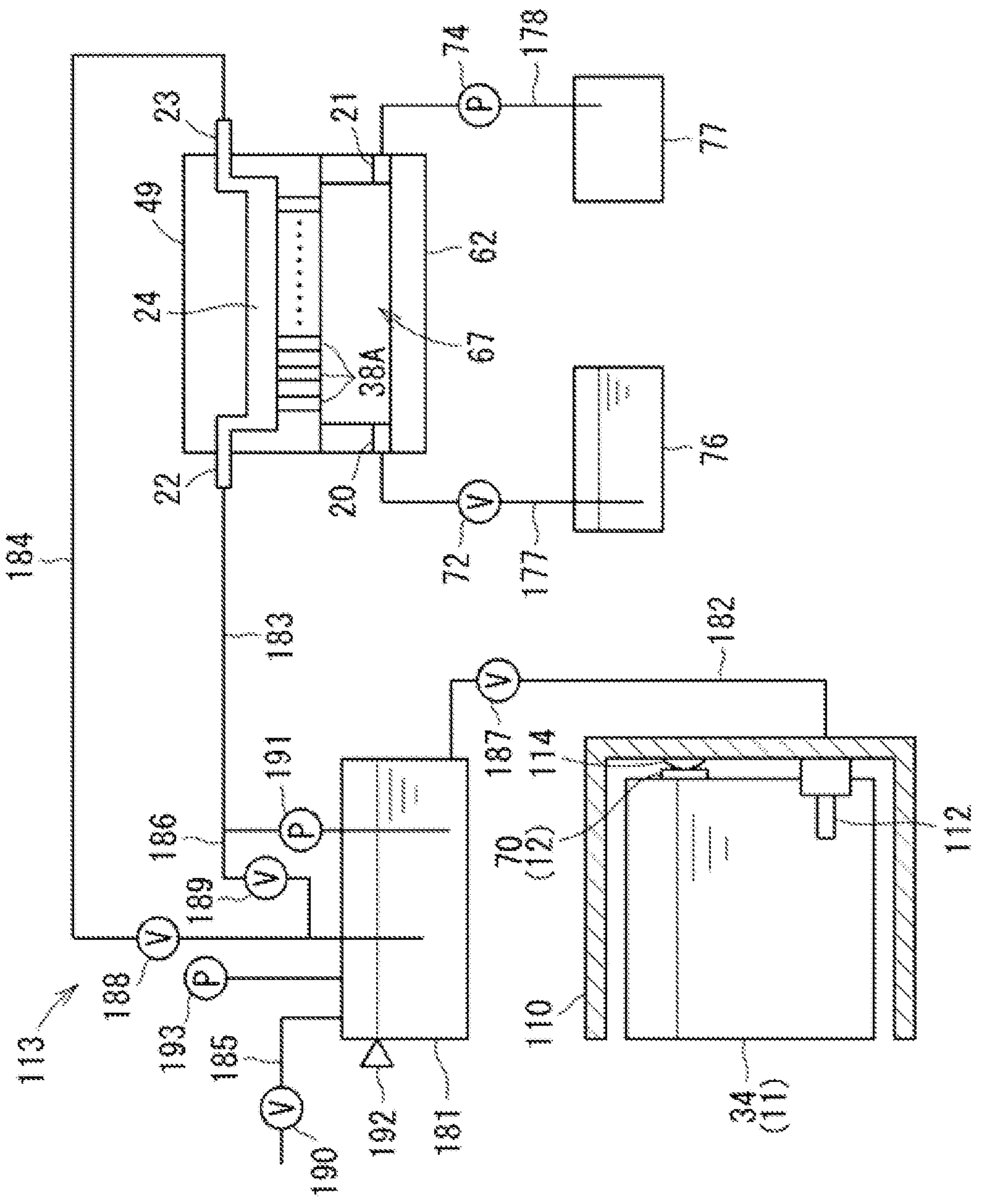
FIG. 9 is a schematic diagram showing an ink circuit 113.

The storage liquid tank 11 (an example of the storage liquid cartridge) illustrated in FIG. 9 has the same configuration as the ink tank 34, except that the retained liquid is the storage liquid. The storage liquid tank 11 can also be attached to the mounting case 110. The storage liquid is supplied to the head 38 through the ink circuit 113 from the storage liquid tank 11 attached to the mounting case 110. The IC substrate 12 is positioned on the back surface of the storage liquid tank 11. The IC substrate 12 stores identification information in the recording region, indicating that it is the storage liquid tank 11.

As illustrated in FIG. 2, the cleaning liquid tank 76 retains cleaning liquid. The cleaning liquid is for cleaning the nozzles 38A of the head 38. The cleaning liquid tank 76 is located below the second support mechanism 52, as described later. The internal space of the cleaning liquid tank 76 is a retaining chamber that retains ink. The retaining chamber may be in air communication with the outside, or may be in the form of a bag such as a pouch that can shrink as the ink flows out. A waste liquid tank 77 is a container where the cleaning liquid is discharged, and is in air communication with the outside. Note that the cleaning liquid tank 76 and the waste liquid tank 77 may also be detachable from the image recording device 100 in the same manner as the ink tank 34. Furthermore, the waste liquid tank 77 may be provided in the same housing as the cleaning liquid tank 76. In this case, the cleaning liquid may be contained in a pouch and the waste liquid may be retained in the internal space of the tank housing. In addition, the cleaning liquid tank 76 may include a main tank that retains the cleaning liquid and a sub-tank that retains the cleaning liquid supplied from the main tank.

The maintenance mechanism 60 is for performing maintenance on the head 38. The maintenance mechanism 60 is configured to be movable, and is moved directly below the head 38 when maintenance of the head 38 is performed (see FIGS. 11 and 12).

Figure 11:
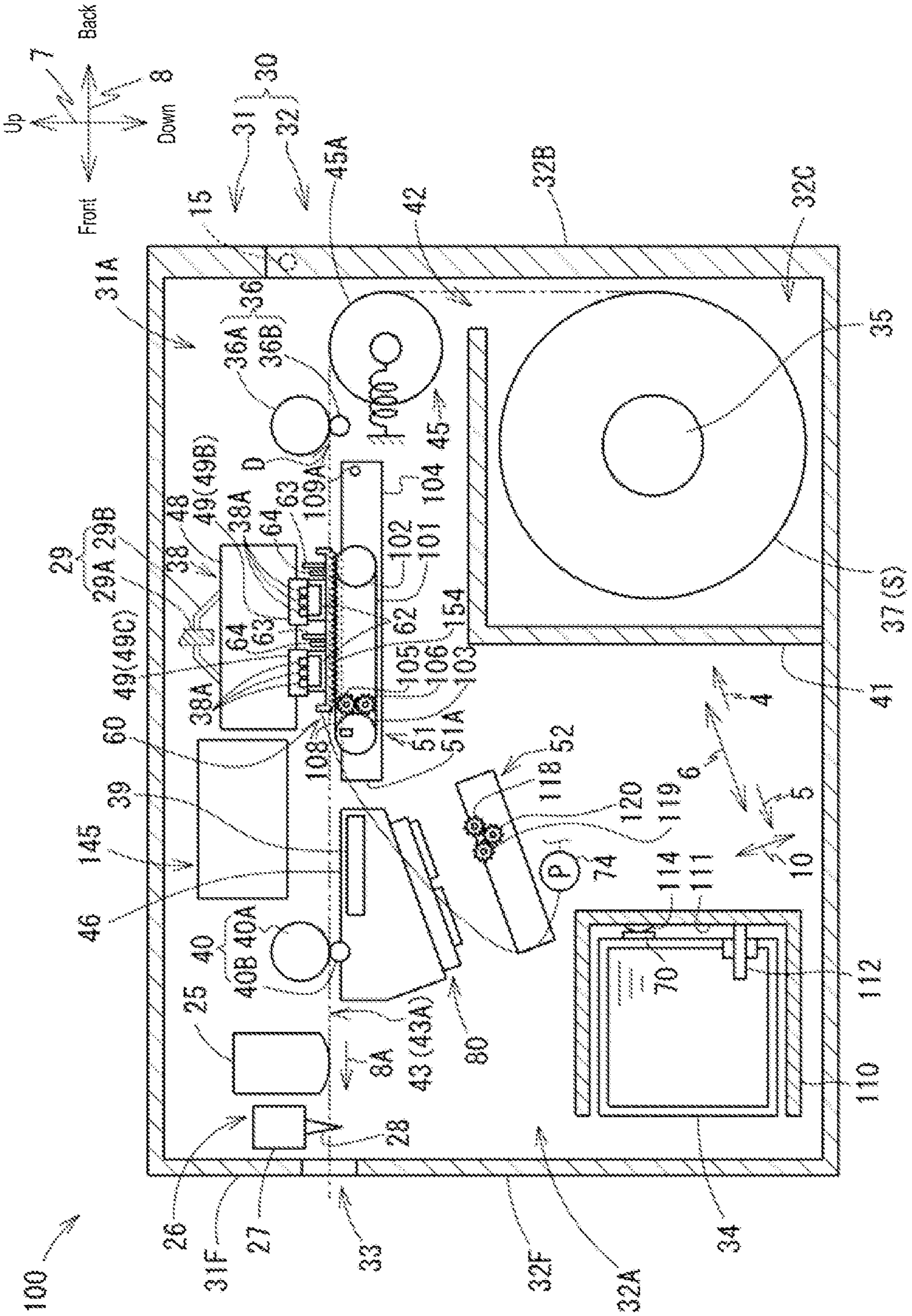
FIG. 11 is a cross-sectional view illustrating the II-II cross section of FIG. 1, indicating a state in which the head 38 is at a capped position, the first support mechanism 51 is at a first orientation, and the maintenance mechanism 60 is at a maintenance position.
Figure 12:
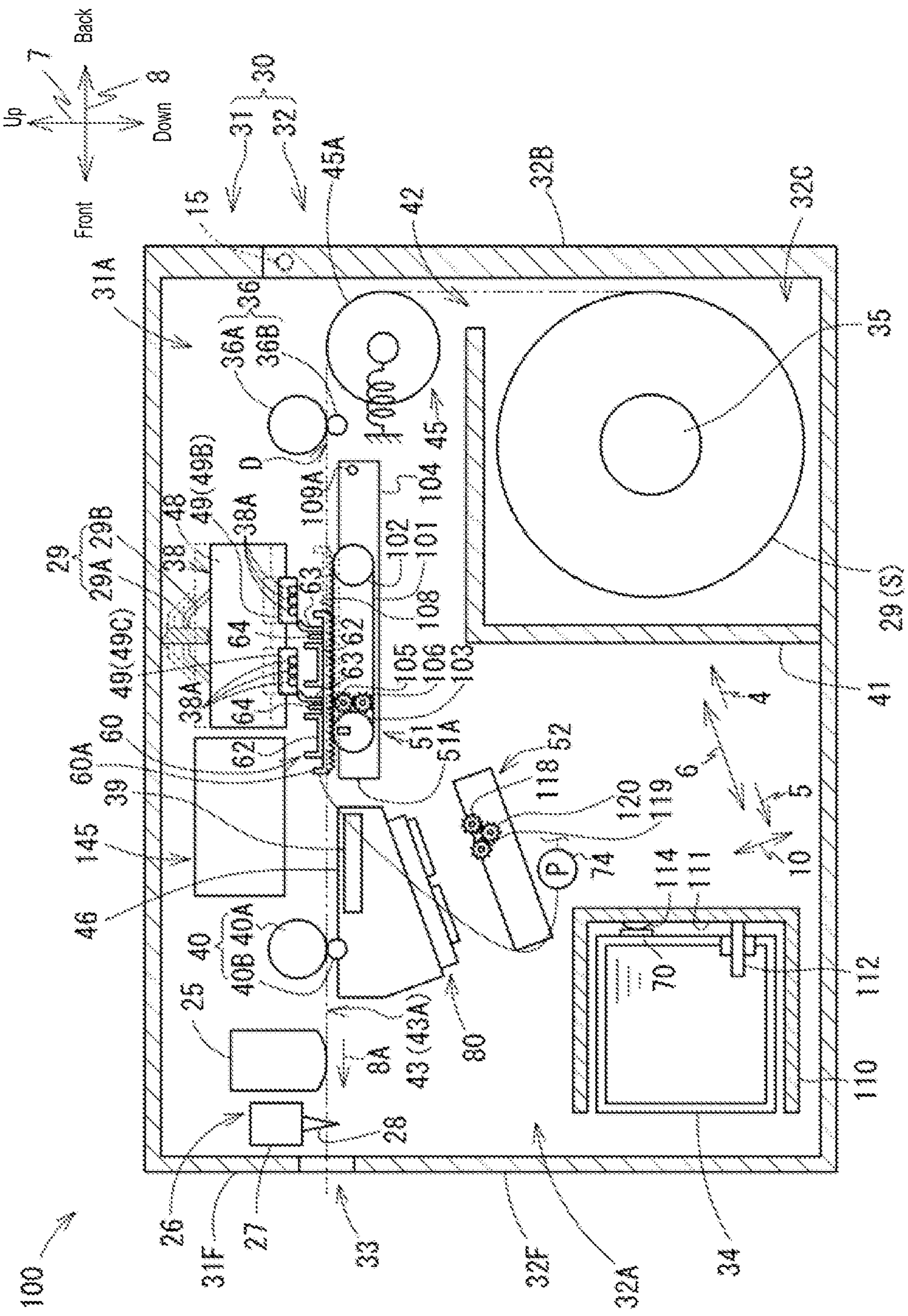
FIG. 12 is a cross-sectional view illustrating the II-II cross section of FIG. 1, indicating a state in which the head 38 is at a wiping position, the first support mechanism 51 is at a first orientation, and the maintenance mechanism 60 is at a wiping position.

Maintenance of the head 38 includes purge processing, cap cleaning, wiping, and the like. Purge processing is, as illustrated in FIG. 11, a process of covering the nozzle surface 50 with a cap 62 of the maintenance mechanism 60, which will be described later, and then sucking ink from the nozzles 38A using a suction pump 74. The cap cleaning is a process of cleaning the nozzle surface 50 of the head 38 with cleaning liquid sent into the internal spaces 67A, 67B, and 67C of the cap 62 while the nozzle surface 50 is covered with the cap 62. Wiping is a process of wiping the nozzle surface 50 of the head 38 with a sponge wiper 64 of the maintenance mechanism 60, which will be described later, as illustrated in FIG. 12. The configuration of the maintenance mechanism 60 will be described later.

The wiper cleaning mechanism 80 is for cleaning the cap 62 and rubber wiper 63 of the maintenance mechanism 60. The maintenance mechanism 60 is moved directly below the wiper cleaning mechanism 80 when the cap 62 and rubber wiper 63 are to be cleaned. A surface of the wiper cleaning mechanism 80 facing the maintenance mechanism 60 is made of sponge, and holds maintenance liquid. The wiper cleaning mechanism 80 can come into contact with a lip 66 and a rubber wiper 63 positioned at a retracted position. As a result, the wiper cleaning mechanism 80 wipes ink attached to the lip 66 of the cap 2 and the rubber wiper 63.

[Head 38]

As illustrated in FIGS. 2 and 4, the head 38 has a substantially rectangular body shape elongated in the left-right direction 9. The head 38 includes a frame 48 and three ejecting modules 49A, 49B, 49C. Hereinafter, the three ejecting modules 49A, 49B, and 49C are also collectively referred to as ejecting module 49. Note that the number of ejecting modules 49 is not limited to three, and may be, for example, one.

As illustrated in FIGS. 2 and 4, the ejecting module 49 is supported by the frame 48. The lower surface of the ejecting module 49 is exposed downward. The ejecting module 49 is arranged in the transport path 43 in the left-right direction 9.

Figure 4A:
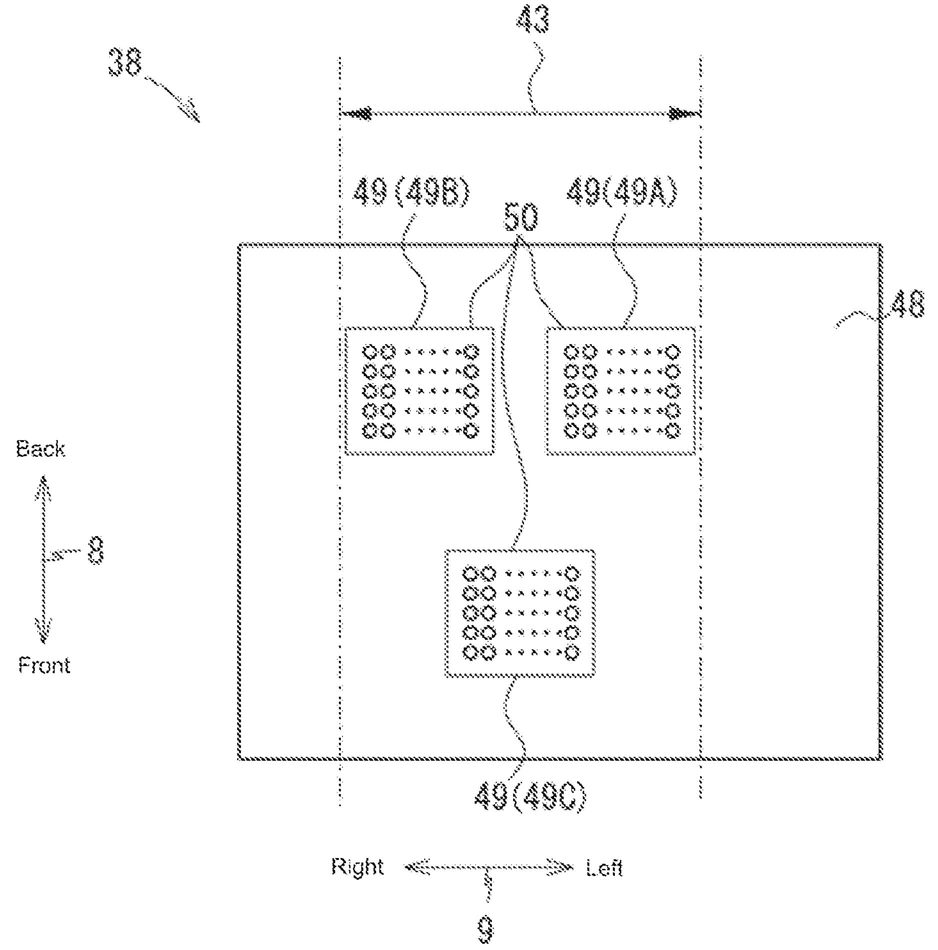
FIG. 4A is a bottom view of the head 38.

As illustrated in FIG. 4A, the ejecting modules 49A and 49B are provided at the same position in the transport direction 8A. The ejecting modules 49A and 49B are arranged with a space therebetween in the left-right direction 9. The ejecting module 49C is arranged downstream of ejecting modules 49A and 49B in the transport direction 8A. The ejecting module 49C is provided between two adjacent ejecting modules 49A and 49B in the left-right direction 9. The left end of the ejecting module 49C is positioned leftward from the right end of the ejecting module 49A. The right end of the ejecting module 49C is positioned rightward from the left end of the ejecting module 49B. In other words, in the left-right direction 9, the ends of the ejecting module 49C and the ends of the ejecting modules 49A and 49B overlap.

Each ejecting module 49A, 49B, 49C contains a plurality of nozzles 38A. Each nozzle 38A is opened on the nozzle surface 50 of each ejecting module 49A, 49B, 49C. The nozzle surface 50 is a surface extending in the front-to-back direction 8 and the left-right direction 9. As described above, ink is ejected downward from the plurality of nozzles 38A toward the sheet S supported by the transport belt 101 of the first support mechanism 51, and an image is recorded on the sheet S.

Figure 4B:
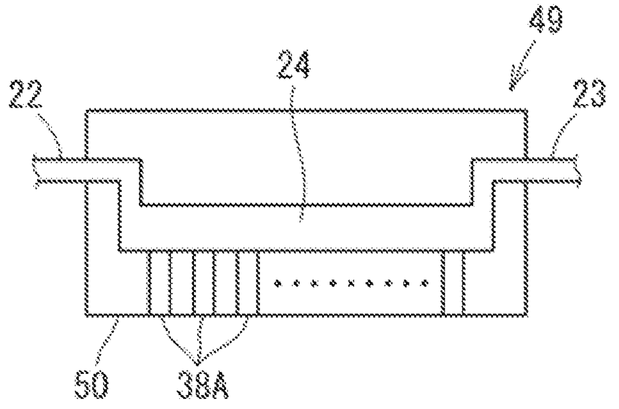
FIG. 4B is a cross-sectional view of the ejecting module 49.

As illustrated in FIG. 4B, the ejecting module 49 has an inflow port 22 and an outflow port 23 connected to the ink circuit 113. The inflow port 22 and the outflow port 23 are both connected to a manifold 24. The manifold 24 is connected to a plurality of nozzles 38A. Ink that has flowed into the manifold 24 through the inflow port 22 is ejected to the outside through the nozzles 38A by driving piezo elements (not illustrated) positioned so as to correspond to the nozzles 38A. The ink in the manifold 24 can be circulated through the inflow port 22 and the outflow port 23.

Figure 14:
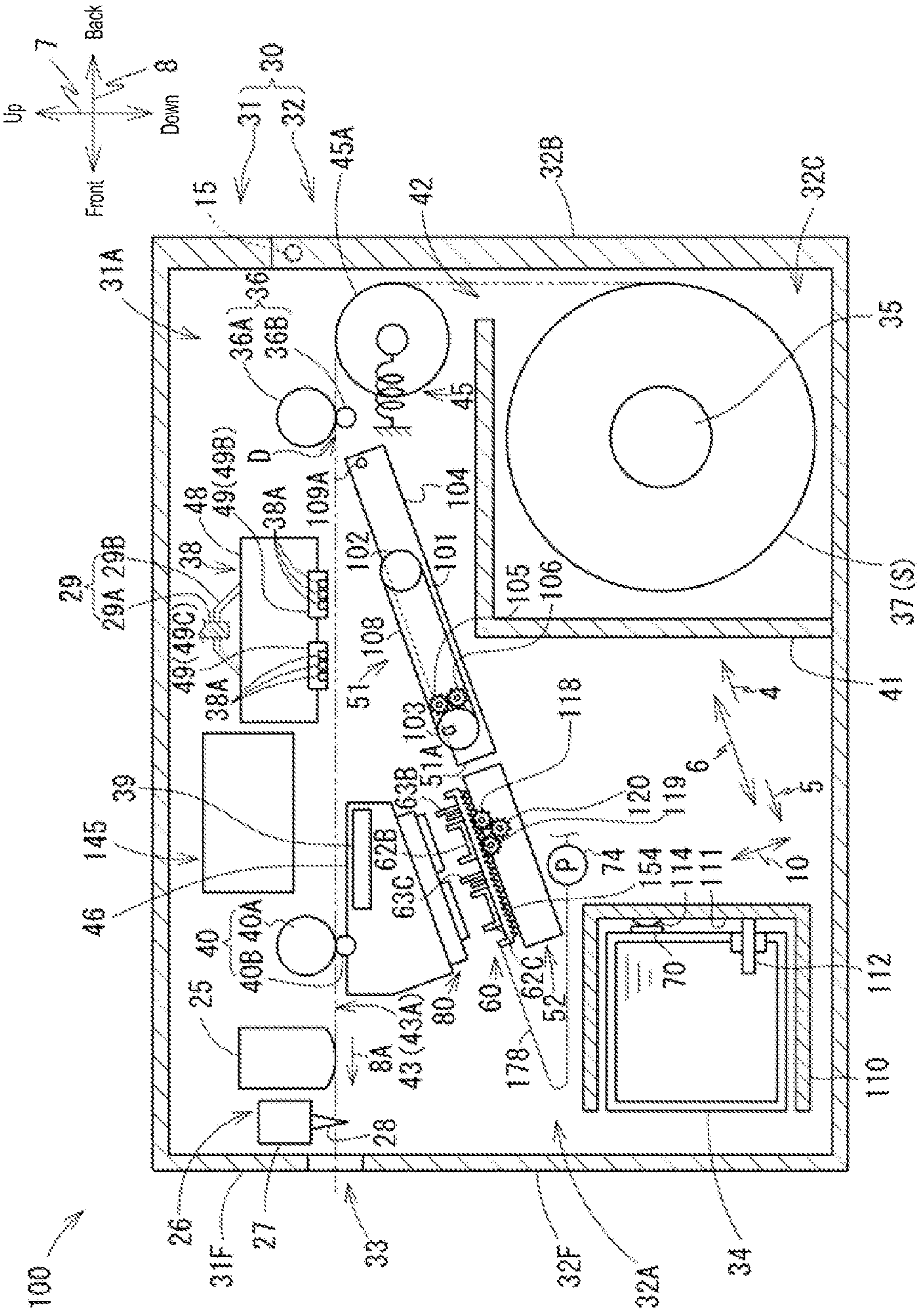
FIG. 14 is a cross-sectional view illustrating the II-II cross section of FIG. 1, indicating a state in which the head 38 is at a recording position, the first support mechanism 51 is at a second orientation, and the maintenance mechanism 60 is at a standby position.

The head 38 moves, along the vertical direction 7, to the recording position illustrated in FIGS. 13 and 14, to the capped position illustrated in FIG. 11, to the wiping position illustrated by the solid lines in FIG. 12, and to the uncapping position illustrated by the dashed line in FIG. 12. The recording position is the position of the head 38 when recording an image on the sheet S supported by the transport belt 101. The capped position is the position of the head 38 when the ejecting module 49 is covered with the cap 62 of the maintenance mechanism 60. The capped position is a position above the recording position (a position farther from the first support mechanism 51 than the recording position). The wiping position is the position of the head 38 when the sponge wiper 64 of the maintenance mechanism 60 wipes the nozzle surface 50 of the ejecting module 49. The wiping position is a position higher than the capping position. The uncapping position is the position of the head 38 when the head 38 is completely separated from the maintenance mechanism 60. The uncapping position is a position above the wiping position.

As illustrated in FIG. 2, the head 38 is moved by the ball screw 29. The ball screw 29 has a screw shaft 29A and a nut member 29B. The screw shaft 29A is supported by the lower housing 32 so as to be rotatable about an axis extending in the vertical direction 7. The screw shaft 29A rotates when a driving force is transmitted from a head motor 54 (see FIG. 10). The nut member 29B moves upward by the forward rotation of the screw shaft 29A, and moves downward by the reverse rotation of the screw shaft 29A. The configuration for vertically moving the head 38 is not limited to the configuration using the ball screw 29, and various other known configurations can be adopted.

[Maintenance Mechanism 60]

Figure 5:
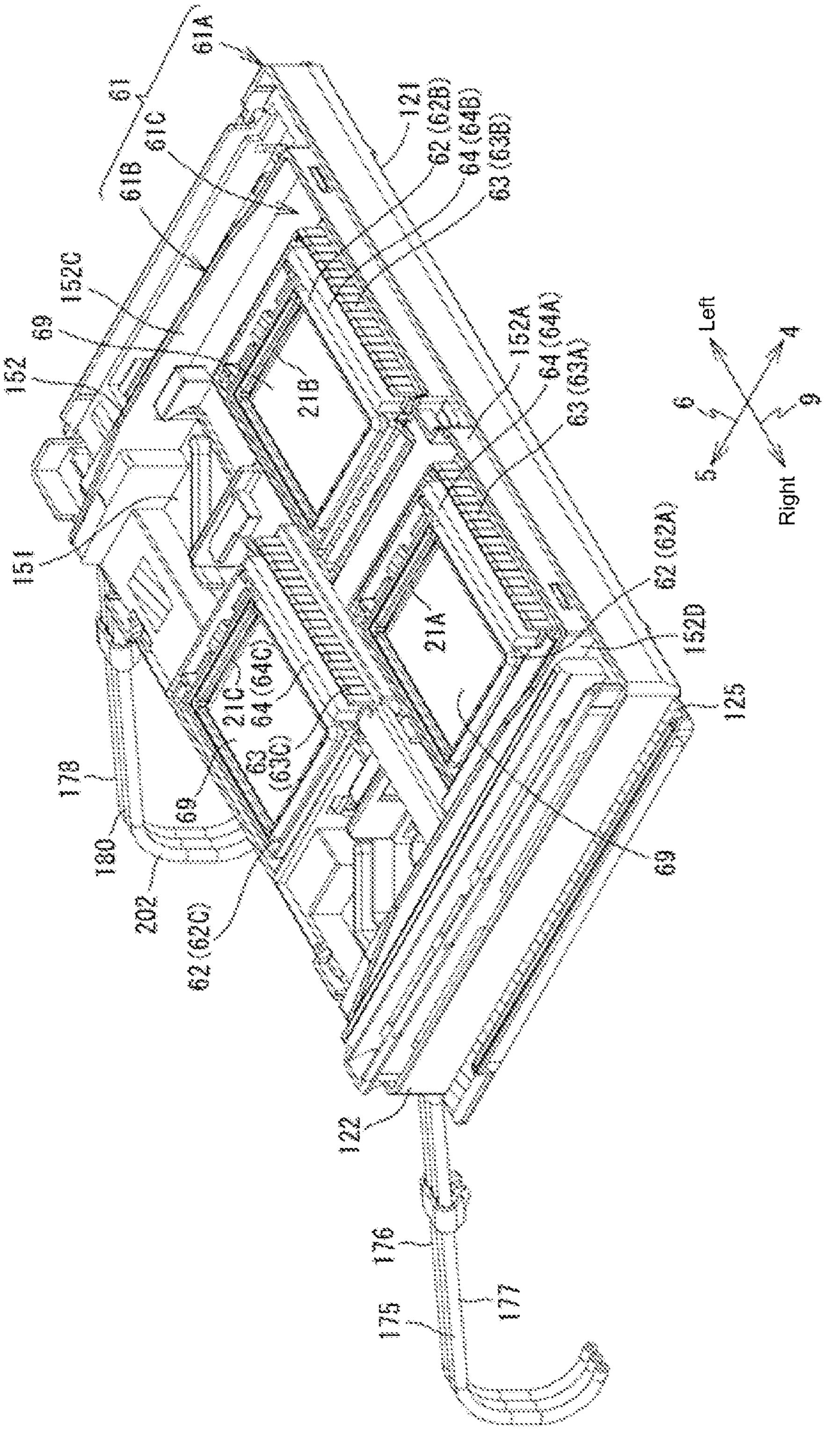
FIG. 5 is a perspective view of a maintenance mechanism 60.

As illustrated in FIG. 5, the maintenance mechanism 60 (an example of a discharge mechanism or a discharge unit) includes a support base 61, a sponge wiper 64, a rubber wiper 63, and a cap 62. In the following description of the maintenance mechanism 60, it is assumed that the maintenance mechanism 60 is supported by the first support mechanism 51 in the second orientation and the second support mechanism 52.

The support base 61 has a base 61A, a main body 61B placed on the base 61A, and a wiper holder 61C that holds the sponge wiper 64 and the rubber wiper 63 on the main body 61B. The base 61A has a box shape with an open top. The base 61A includes a first bottom plate 121, a first edge plate 122 standing vertical from the peripheral edge of the first bottom plate 121, an extending piece 125, and a rack 154 (see FIG. 2).

The first bottom plate 121 has a flat plate shape extending in the sloping direction 6 and the left-right direction 9. The upper and lower surfaces of the first bottom plate 121 are formed in a rectangular shape that is longer in the horizontal direction 9 than the sloping direction 6. The lower surface of the first bottom plate 121 can contact the upper surface of the first support mechanism 51 from above. Thereby, the maintenance mechanism 60 can be supported by the first support mechanism 51. The lower surface of the first bottom plate 121 can contact the upper surface of the second support mechanism 52 from above. Thereby, the maintenance mechanism 60 can be supported by the second support mechanism 52.

The first edge plate 122 has a rectangular frame shape in plan view. The extending piece 125 extends rightward from the lower end part of the right wall of the first edge plate 122. The extending piece 125 extends from one end of the right wall of the first edge plate 122 in the sloping direction 6 to the other end.

Figure 6:
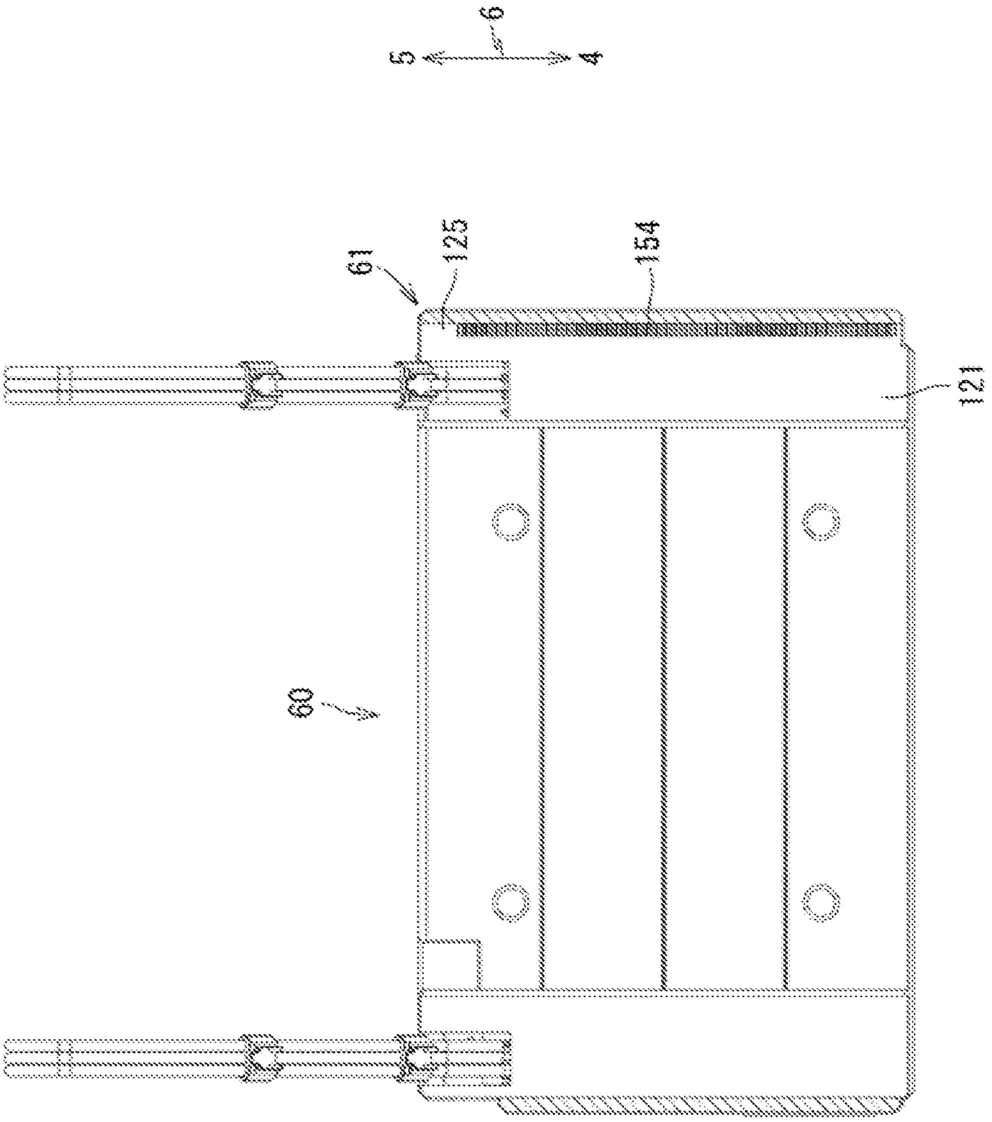
FIG. 6 is a bottom view of the maintenance mechanism 60.

As illustrated in FIG. 6, the rack 154 is formed on the lower surface of the extending piece 125. The rack 154 extends from one end of the extending piece 125 in the sloping direction 6 to the vicinity of the other end. The rack 154 can vertically face the upper surface of the first support mechanism 51.

The rack 154 can mesh with the gear 105 of the first support mechanism 51. The maintenance mechanism 60 slides along the upper surface of the first support mechanism 51 by rotating the gear 105 while the rack 154 and gear 105 are meshed.

The rack 154 can mesh with the gears 118 and 119 of the second support mechanism 52. The maintenance mechanism 60 slides along the upper surface of the second support mechanism 52 by rotating the gear 120 in a condition where the rack 154 is meshed with at least one of the gears 118 and 119.

As a result, the maintenance mechanism 60 can move to a standby position as illustrated in FIG. 2, a retracted position as illustrated by dashed lines in FIG. 12, a maintenance position as illustrated in FIG. 11, and a wiping position as illustrated in FIG. 12, as will be described later. The maintenance mechanism 60 at the maintenance position and at the wiping position faces the nozzle surface 50 of the ejecting module 49 of the head 38 in the vertical direction 7.

The maintenance mechanism 60 at the standby position and at the retracted position is separated from the nozzle surface 50.

As illustrated in FIG. 5, the main body 61B has a substantially box-like shape with an open top. The main body 61B is fixed to the base 61A. The main body 61B includes a second bottom plate 151, a second edge plate 152 standing vertical from the second bottom plate 151, and a liquid channel 153 (see FIG. 7) for circulating the cleaning liquid retained in the cleaning liquid tank 76.

Figure 7:
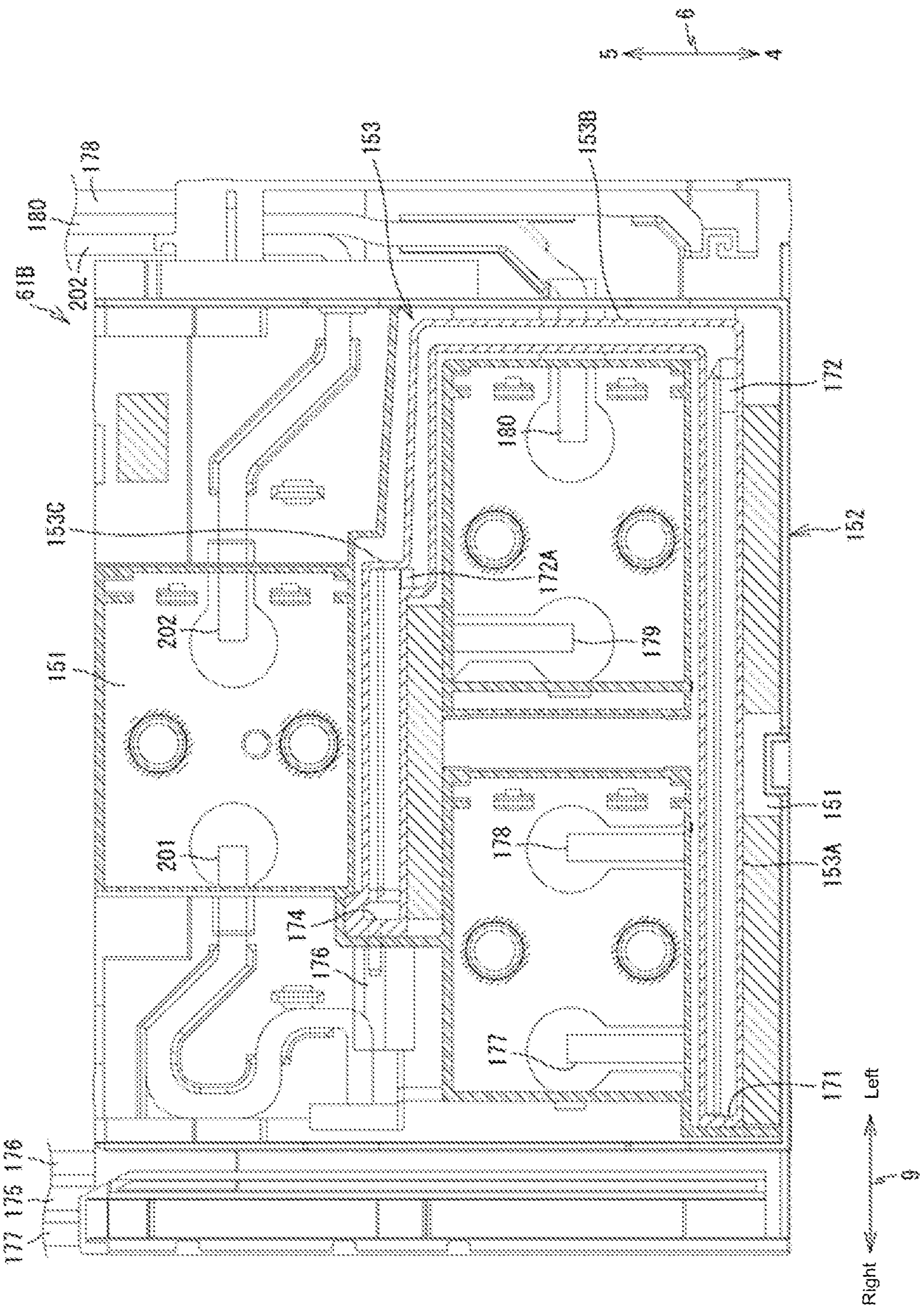
FIG. 7 is a cross-sectional view of the liquid channel 153 of the support base 61 cut along a plane parallel to the flow direction of the liquid channel 153.

As illustrated in FIGS. 5 and 7, the second bottom plate 151 has a flat plate shape extending in the sloping direction 6 and the left-right direction 9. The upper and lower surfaces of the second bottom plate 151 are formed in a rectangular shape that is longer in the left-right direction than the sloping direction 6. The second edge plate 152 has a rectangular frame shape in plan view.

As illustrated in FIG. 7, the liquid channel 153 is formed on the upper surface of the second bottom plate 151. The liquid channel 153 is a recessed groove that is recessed downward from the upper surface of the second bottom plate 151 and opens upward. The liquid channel 153 has a continuous U-shape that extends in the left-right direction 9 and turns back to make a U-turn in plan view. The liquid channel 153 extends to connect in series the sponge wipers 64A, 64B, and 64C arranged in a concave groove. The liquid channel 153 has a first channel 153A, an intermediate channel 153B, and a second channel 153C.

The first channel 153A is positioned upstream in the liquid channel 153 in the cleaning liquid flow direction. The first channel 153A is a portion that extends in the left-right direction 9 on the front side of the main body 61B.

An intermediate channel 153B is located downstream of the first channel 153A in the cleaning liquid flow direction. The intermediate channel 153B extends in the forward sloping direction 5 from the downstream end of the first channel 153A to a middle portion in the sloping direction 6 of the main body 61B.

The second channel 153C is positioned downstream in the liquid channel 153 in the cleaning liquid flow direction. The second channel 153C extends rightward from the downstream end of the intermediate channel 153B.

As illustrated in FIG. 9, an inflow port 171 through which the cleaning liquid flows into the first channel 153A is opened in the inner wall surface of the groove at the upstream end of the first channel 153A. One end of a first supply tube 175 is connected to the inflow port 171. The other end of the first supply tube 175 extends to the outside of the first support mechanism 51, is connected to the cleaning liquid tank 76, and opens at a position lower than the water surface of the cleaning liquid retained in the cleaning liquid tank 76.

An outflow port 174 through which the cleaning liquid flows out is opened in the inner wall surface at the downstream end of the second channel 153C. One end of a return tube 176 is connected to the outflow port 174. The other end of the return tube 176 extends to the outside of the first support mechanism 51, is connected to the cleaning liquid tank 76, and opens at a position higher than the water surface of the cleaning liquid retained in the cleaning liquid tank 76. A return pump 75 is provided on the return tube 176 (see FIG. 2). Driving of the return pump 75 is controlled by the controller 130.

As illustrated in FIG. 5, the wiper holder 61C has a sponge wiper 64 and a rubber wiper 63. The sponge wiper 64 and the rubber wiper 63 are supported on the main body 61B by a wiper holder 61C.

[Sponge Wiper 64]

The sponge wiper 64 is made of sponge. In this Embodiment, three sponge wipers 64 (64A, 64B, 64C) are provided. Hereinafter, the three sponge wipers 64A, 64B, and 64C are also collectively referred to as the sponge wiper 64. The sponge wiper 64 is formed in the shape of a rectangular body whose length in the left-right direction 9 is longer than the length in the sloping direction 6 and the vertical direction 7. The length of the sponge wiper 64 in the vertical direction 7 is longer than the length in the sloping direction 6.

The sponge wiper 64A and sponge wiper 64B are arranged in first channel 153A of the liquid channel 153. The sponge wiper 64A is arranged upstream of the sponge wiper 64B. The sponge wiper 64C is arranged in the second channel 153C of the liquid channel 153.

The sponge wiper 64A, sponge wiper 64B, and sponge wiper 64C correspond to ejecting module 49A, ejecting module 49B, and ejecting module 49C, respectively, in the vertical direction 7. The sponge wiper 64A and sponge wiper 64B are arranged apart from each other in the left-right direction 9. The sponge wiper 64C is spaced in a forward sloping direction 5 from the sponge wipers 64A and 64B. The sponge wiper 64C is positioned in the middle between the sponge wiper 64A and the sponge wiper 64B in the left-right direction 9.

The sponge wiper 64A corresponds to the ejecting module 49A, and can face the ejecting module 49A in the vertical direction 7. As illustrated in FIGS. 5 and 7, the sponge wiper 64A is arranged on the right side of the center in the left-right direction 9 of the first channel 153A.

[Rubber Wiper 63]

The rubber wiper 63 is made of rubber. In this Embodiment, three rubber wipers 63 (63A, 63B, 63C) are provided. Hereinafter, the three rubber wipers 63A, 63B, and 63C are also collectively referred to as the rubber wiper 63.

The rubber wiper 63 is formed in a flat plate shape extending in the vertical direction 7 and the horizontal direction 9. The length of the rubber wiper 63 in the sloping direction 6 is shorter than the length of the sponge wiper 64 in the sloping direction 6. As a result, the rubber wiper 63 is easily bent when coming into contact with the nozzle surface 50 of the ejecting module 49 during the wiping process. The length of the rubber wiper 63 in the left-right direction 9 is slightly longer than the length of the sponge wiper 64 in the left-right direction 9. The length of the rubber wiper 63 from the support base 61 is longer than the length of the sponge wiper 64 from the support base 61. The rubber wiper 63 is positioned outside in the left-right direction 9 relative to both ends of the sponge wiper 64 in the left-right direction 9. The upper end of the rubber wiper 63 is tapered. This facilitates the upper end of the rubber wiper 63 coming into contact with the nozzle surface 50 of the ejecting module 49 during the wiping process.

Rubber wiper 63A and rubber wiper 63B are arranged outside of the liquid channel 153. The rubber wiper 63A, rubber wiper 63B, and rubber wiper 63C correspond to ejecting module 49A, ejecting module 49B, and ejecting module 49C, respectively, in the vertical direction 7. The rubber wiper 63A, the rubber wiper 63B, and the rubber wiper 63C are arranged on the support base 61 at intervals in a backward sloping direction 4 from the sponge wiper 64A, the sponge wiper 64B, and the sponge wiper 64C, respectively.

[Cap 62]

As illustrated in FIG. 5, the cap 62 is supported by the support base 61. A plurality of caps 62 are provided. In this Embodiment, the cap 62 is composed of three caps 62A, 62B, and 62C. Hereinafter, the three caps 62A, 62B, and 62C are also collectively referred to as the cap 62.

The cap 62 is made of an elastic material such as rubber or silicon. The cap 62 has a box shape with an open top.

The caps 62A, 62B, and 62C can face the ejecting module 49A, the ejecting module 49B, and the ejecting module 49C in the vertical direction 7, respectively. Cap 62A, cap 62B and cap 62C are spaced in the forward sloping direction 5 from sponge wiper 64A, sponge wiper 64B and sponge wiper 64C, respectively. Lips 66A, 66B, and 66C (see FIG. 8) of the caps 62A, 62B, and 62C abut against the nozzle surface 50 to seal internal spaces 67A, 67B, and 67C when the maintenance mechanism 60 is positioned at the maintenance position. The caps 62A, 62B and 62C respectively have cap channels 68A, 68B and 68C that facilitate communication between the internal spaces 67A, 67B and 67C and the outside. The cap channels 68A, 68B, 68C are composed of the supply channels 20A, 20B, 20C through which the cleaning liquid flows into the internal spaces 67A, 67B, 67C of the cap 62, and the discharge channels 21A, 21B, and 21C (an example of a fourth channel) through which the cleaning liquid flows out from the internal spaces 67A, 67B, 67C of the cleaning liquid caps 62A, 62B, 62C.

Hereinafter, the three lips 66A, 66B, and 66C will also be collectively referred to as lip 66. Furthermore, in a similar manner, the internal spaces 67A, 67B, 67C, the cap channels 68A, 68B, 68C, the supply channels 20A, 20B, 20C, and the discharge channels 21A, 21B, 21C are also referred to as internal spaces 67, cap channels 68, supply channels 20, and discharge channels 21.

Figure 8:
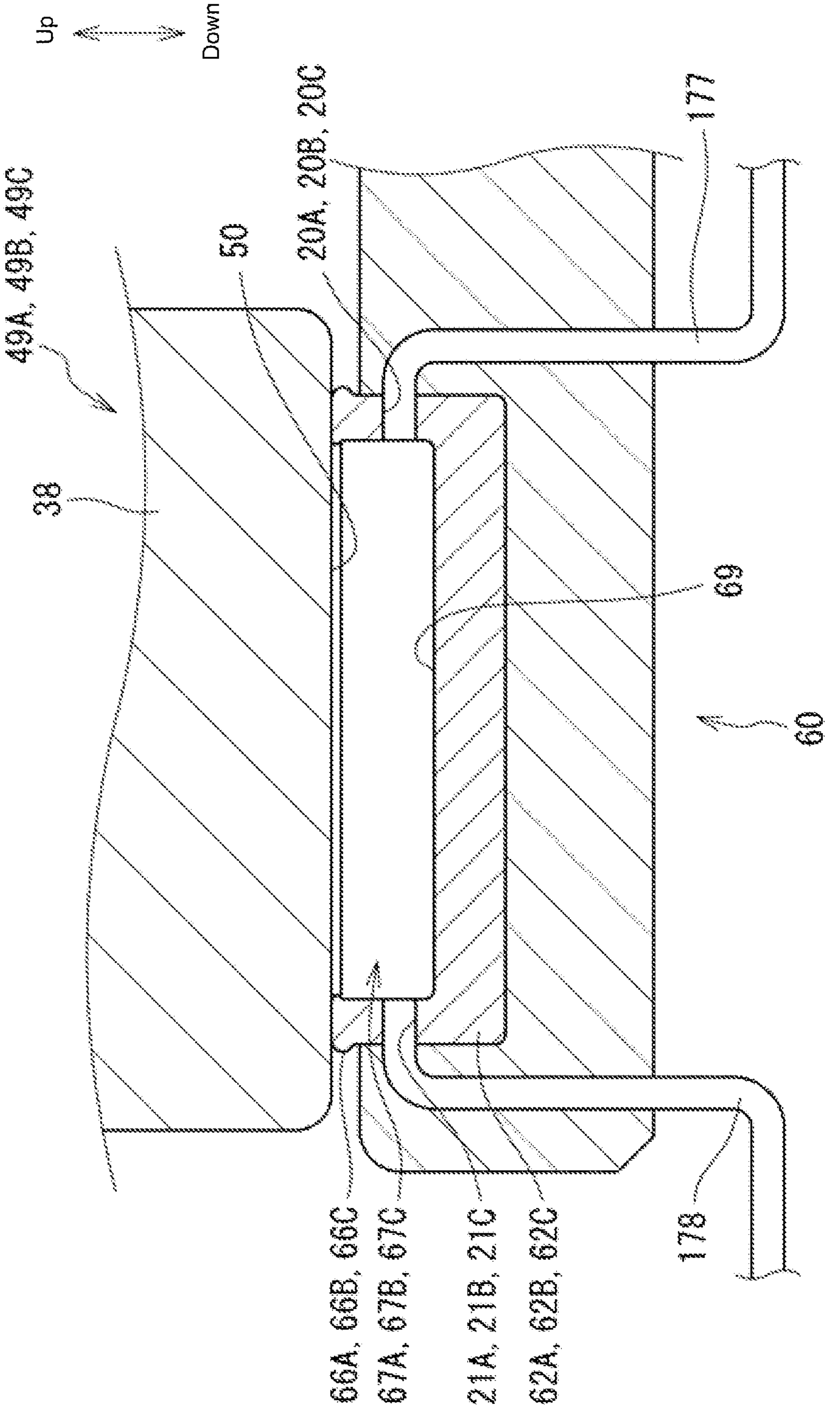
FIG. 8 is a cross-sectional view of caps 62A, 62B, 62C in a maintenance position.

As illustrated in FIG. 8, the cap 62A corresponds to the ejecting module 49A and can face the ejecting module 49A in the vertical direction 7. The cap 62A is spaced in the forward sloping direction 5 from the sponge wiper 64A. The bottom plate 69 of the cap 62A is formed with a supply channel 20A through which the cleaning liquid flows into the cap 62A and a discharge channel 21A through which the cleaning liquid flows out from the cap 62A. One end of a second supply tube 177 is connected to the supply channel 20A of the cap 62A. The other end of the second supply tube 177 extends outside the maintenance mechanism 60 and is connected to the cleaning liquid tank 76 (see FIG. 2). One end of a first waste liquid tube 178 is connected to the discharge channel 21A. The other end of the first waste liquid tube 178 extends to outside of the maintenance mechanism 60 and is connected to the waste liquid tank 77 (see FIG. 2).

The cap 62B corresponds to the ejecting module 49B and can face the ejecting module 49B in the vertical direction 7. The cap 62B is spaced in the forward sloping direction 5 from the sponge wiper 64B. The bottom plate 69 of the cap 62B is formed with a supply channel 20B through which the cleaning liquid flows into the cap 62B and a discharge channel 21B through which the cleaning liquid flows out from the cap 62B. One end of a third supply tube 179 branched from the second supply tube 177 is connected to the supply channel 20B. One end of the second waste liquid tube 180 is connected to the discharge channel 21B. The other end of the second waste liquid tube 180 merges with the first waste liquid tube 178 outside the maintenance mechanism 60.

The cap 62C corresponds to the ejecting module 49C and can face the ejecting module 49C in the vertical direction 7. The cap 62C is spaced in the forward sloping direction 5 from the sponge wiper 64C. The bottom plate 69 of the cap 62C is formed with a supply channel 20C through which the cleaning liquid flows into the cap 62C and a discharge channel 21C through which the cleaning liquid flows out from the cap 62C. One end of a fourth supply tube 201 branched from the second supply tube 177 is connected to the supply channel 20C. One end of the third waste liquid tube 202 is connected to the discharge channel 21C. The other end of the third waste liquid tube 202 merges with the first waste liquid tube 178 outside the maintenance mechanism 60.

A cap cleaning valve 72 (see FIG. 9) is provided on the upstream side of the branch point for the third supply tube 179 and the fourth supply tube 201 in the second supply tube 177. The opening and closing of the cap cleaning valve 72 is controlled by the controller 130.

The second waste liquid tube 180 and the third waste liquid tube 202 in the first waste liquid tube 178 are both provided with a suction pump 74 (see FIG. 2) on the upstream side of the junction. The three suction pumps 74 are driven by one suction pump motor 58 (see FIG. 10).

The total Ta of the volume of the supply channel 20A, the volume of the discharge channel 21A, the volume upstream of the suction pump 74 in the first waste liquid tube 178, and the volume of the internal space of the cap 62A is equivalent to the total Tb of the volume of the supply channel 20B, the volume of the discharge channel 21B, the volume upstream of the suction pump 74 in the second waste liquid tube 180, and the volume of the internal space of the cap 62B, and equivalent to the total Tc of the volume of the supply channel 20C, the volume of the discharge channel 21C, the volume upstream of the suction pump 74 in the third waste liquid tube 202, and the volume of the internal space of the cap 62C (total Ta=total Tb=total Tc).

[Ink Circuit 113]

As illustrated in FIG. 9, the mounting case 110 and the ejecting module 49 are connected by an ink circuit 113. The ink circuit 113 includes an ink sub-tank 181, channels 182, 183, 184, an atmosphere channel 185, a bypass channel 186, a supply valve 187, a purge shutoff valve 188, a bypass valve 189, an atmospheric release valve 190, a positive pressure pump 191, and a liquid level sensor 192.

The ink sub-tank 181 is located above the mounting case 110 in the internal space of the housing 30. The ink sub-tank 181 retains ink in its internal space. The internal space of the ink sub-tank 181 communicates with the ink needle 112 of the mounting case 110 via a channel 182 (an example of a first channel). With the ink tank 34 attached to the mounting case 110, the ink retained in the ink tank 34 can flow into the ink sub-tank 181 through the channel 182. Furthermore, in a state where the storage liquid tank 11 is attached to the mounting case 110, the storage liquid retained in the storage liquid tank 11 can flow into the ink sub-tank 181 through the channel 182. A supply valve 187 is positioned in the channel 182. The supply valve 187 is controlled by the controller 130 to open and close the channel 182.

The internal space of the ink sub-tank 181 and the inflow port 22 of the ejecting module 49 mutually communicate through a channel 183 (an example of a second channel). Ink or storage liquid retained in the internal space of the ink sub-tank 181 can be supplied to the ejecting module 49 through the channel 183. A positive pressure pump 191 is positioned in the channel 183. The positive pressure pump 191 operates when the controller 130 controls the drive of the pump motor 138 (see FIG. 10).

The internal space of the ink sub-tank 181 and the outflow port 23 of the ejecting module 49 mutually communicate through a channel 184 (an example of a third channel). Ink or storage liquid in the manifold 24 of the ejecting module 49 can be discharged to the ink sub-tank 181 through the channel 184. A purge shutoff valve 188 is positioned in the channel 184. The purge shutoff valve 188 is controlled by the controller 130 to open and close the channel 184.

A bypass channel 186 connects between the positive pressure pump 191 and the inflow port 22 in the channel 183 and between the purge shutoff valve 188 and the ink sub-tank 181 in the channel 184. A bypass valve 189 is provided in the bypass channel 186. The bypass valve 189 is controlled by the controller 130 to open and close the bypass channel 186.

An atmosphere channel 185 enables communication between the internal space and the outside of the ink sub-tank 181. An atmospheric release valve 190 is located in the atmosphere channel 185. The atmospheric release valve 190 is controlled by the controller 130 to open and close the atmosphere channel 185.

A liquid level sensor 192 is positioned in the ink sub-tank 181. The liquid level sensor 192 detects the presence or absence of ink at a prescribed height in the internal space of the ink sub-tank 181. The liquid level sensor 192 outputs a detection signal to the controller 130. The liquid level sensor 192 outputs an ON signal as a detection signal when ink is detected, and outputs an OFF signal as a detection signal when ink is not detected. The controller 130 determines whether the liquid level in the internal space of the ink sub-tank 181 has reached a prescribed height based on the detection signal output by the liquid level sensor 192.

A negative pressure pump 193 is connected to the ink sub-tank 181. The negative pressure pump 193 reduces pressure in the internal space of the ink sub-tank 181 by discharging the gas in the internal space of the ink sub-tank 181 to the outside.

[Controller 130]

As illustrated in FIG. 10, the controller 130 has a CPU 131, ROM 132, RAM 133, EEPROM 134 and ASIC 135, which are connected by an internal bus 137. The ROM 132 stores programs and the like for controlling various operations of the CPU 131. The RAM 133 is used as a storage area for temporarily recording data, signals, and the like, used when the CPU 131 executes the above programs, or used as a working area for data processing. The EEPROM 134 stores settings, flags, and the like that should be retained even after the power is turned OFF.

The ASIC 135 connects transport motor 53, head motor 54, first motor 55, second motor 56, return pump motor 47, suction pump motor 58, pump motors 138 and 139, shaft motor 59, vertical drive motor 163, operating panel 44, display part 44A, contact 114, and liquid level sensor 192. The ASIC 135 is also connected to the cap cleaning valve 72, the supply valve 187, the purge shutoff valve 188, the bypass valve 189, and the atmospheric release valve 190. Each valve is connected to the ASIC 135 via a drive circuit for driving the valve.

The ASIC 135 generates a drive signal for rotating each motor, and controls each motor based on this drive signal. Each motor rotates forward or backward according to a drive signal from the ASIC 135. The controller 130 controls driving of the transport motor 53 to rotate the holder 35, the transport roller 36A, the transport roller 40A, and the drive roller 102. The controller 130 controls driving of the head motor 54 to rotate the screw shaft 29A and move the head 38 along the vertical direction 7. The controller 130 controls driving of the shaft motor 59 to rotate the first support mechanism 51. The controller 130 controls driving of the first motor 55 to rotate the gear 106 of the first support mechanism 51. The controller 130 controls driving of the vertical drive motor 163 to rotate the screw shaft 161 and move the second support mechanism 52 along the orthogonal direction 10. The controller 130 controls driving of the second motor 56 to rotate the gear 120 of the second support mechanism 52. The controller 130 controls the drive of the return pump motor 78 to drive the return pump 75. The controller 130 controls the drive of the suction pump motor 58 to drive the three suction pumps 74. The controller 130 controls driving of the pump motor 138 to drive the positive pressure pump 191. The controller 130 controls driving of the pump motor 139 to drive the negative pressure pump 193.

The ASIC 35 is connected to the operating panel 44, the display part 44A, the contact 114, the liquid level sensor 192, and the piezoelectric element (not illustrated). The operating panel 44 outputs an operating signal to the controller 130 based on the operation by the user. The operating panel 44 may have, for example, push buttons, or may have a touch sensor superimposed on the display. The display part 44A displays that the lid member 82 is attached to the support member 81. The controller 130 reads or writes to the memory region of the IC substrate 70 of the ink tank 34 or the IC substrate 12 of the storage liquid tank 11 through the contact 114. The controller 130 receives a detection signal from the liquid level sensor 192. The piezoelectric element operates by being powered by the controller 130 via a drive circuit (not illustrated). The controller 130 controls power supplied to the piezoelectric element to selectively eject ink droplets from the plurality of nozzles 38A.

[Ink]

Details of the ink are described below. The ink contains resin microparticles, a coloring agent, an organic solvent, a surfactant, and water. The ink is a water-based ink in which resin microparticles, a coloring agent, and an organic solvent are dissolved in water.

The ink is wet-able to hydrophobic recording media such as coated paper, plastic, film, OHP sheet, and the like, but this is not a limitation. Recording media other than hydrophobic recording media such as normal paper, glossy paper, matte paper, and the like may be suitable, for example. "Coated paper" refers to plain paper containing mainly pulp, such as high-grade printing paper and intermediate-grade printing paper, coated with a coating agent to improve smoothness, whiteness, gloss, and the like. Specific examples include high-grade coated paper, intermediate-grade coated paper, and the like.

For example, the resin microparticles may contain at least one of methacrylic acid or acrylic acid as a monomer, including commercially available products, for example. The resin microparticles may further contain, for example, styrene, vinyl chloride, and the like as monomers. The resin microparticles may be included in an emulsion, for example. The emulsion is composed of, for example, resin microparticles and a dispersing medium (such as water or the like). The resin microparticles are not dissolved in the dispersing medium, but are within a specific particle size range when dispersed. Examples of resin microparticles include acrylic acid resins, maleic acid ester resins, vinyl acetate resins, carbonate resins, polycarbonate resins, styrene resins, ethylene resins, polyethylene resins, propylene resins, polypropylene resins, urethane resins, polyurethane resins, polyester resins, copolymer resins thereof, and the like, but acrylic resins are preferred.

As the resin microparticles, for example, a resin having a glass transition temperature (Tg) in the range of 0° C. or higher and 200° C. or lower is used. More preferably, the glass transition temperature (Tg) is 20° C. or higher and 180° C. or lower, and still more preferably 30° C. or higher and 150° C. or lower.

The emulsion may be a commercially available product, for example. Commercially available products include, for example, "Superflex (registered trademark) 870" (Tg: 71° C.), and "Superflex (registered trademark) 150" (Tg: 40° C.) manufactured by DKS Co., Ltd.; "Mowinyl (registered trademark) 6760" (Tg: −28° C.) and "Mowinyl (registered trademark) DM774" (Tg: 33° C.) manufactured by Japan Coating Resin Co., Ltd.; "Polysol (registered trademark) AP-3270N" (Tg: 27° C.) manufactured by Showa Denko K. K.; "Hirose-X (registered trademark) KE-1062" (Tg: 112° C.) and "Hirose-X (registered trademark) QE-1042" (Tg: 69° C.) manufactured by Seiko PMC Co., Ltd.; and the like.

The average particle diameter of the resin microparticles is, for example, within a range of 30 nm or more and 200 nm or less. The average particle size can be measured as the arithmetic mean diameter using, for example, an LB-550 dynamic light scattering particle size analyzer manufactured by HORIBA, Ltd.

The content (R) of resin microparticles in the total amount of the ink is, for example, preferably in a range of 0.1 wt % or higher and 30 wt % or lower, more preferably in a range of 0.5 wt % or higher and 20 wt % or lower, and particularly preferably within a range of 1.0 wt % or higher and 15.0 wt % or lower. One type of resin microparticles may be used alone, or two or more types may be used in combination.

The coloring agent is a water dispersible pigment, for example, by means of a resin for pigment dispersion (resin dispersing agent). Examples of coloring agents include carbon black, inorganic pigments, organic pigments, and the like. Examples of the carbon black include furnace black, lamp black, acetylene black, channel black, and the like. Examples of inorganic pigments include titanium dioxide, iron oxide inorganic pigments, carbon black inorganic pigments, and the like. Examples of the organic pigments include azo pigments such as azo lakes, insoluble azo pigments, condensed azo pigments, and chelated azo pigments; polycyclic pigments such as phthalocyanine pigments, perylene and perinone pigments, anthraquinone pigments, quinacridone pigments, dioxazine pigments, thioindigo pigments, isoindolinone pigments, quinophthalone pigments, and the like; dye lake pigments such as basic dye-type lake pigments and acid dye-type lake pigments; nitro pigments; nitroso pigments; aniline black daylight fluorescent pigments; and the like.

The solid content of the coloring agent in the total amount of ink is not particularly limited, and can be determined as appropriate depending on, for example, the desired optical density or chroma. The solid content of the coloring agent is, for example, preferably in a range of 0.1 wt % or more and 20.0 wt % or less, more preferably in a range of 1.0 wt % or more and 15.0 wt % or less. The solid content of the coloring agent is the weight of the pigment only, and does not include the weight of the resin microparticles. One type of coloring agent may be used alone, or two or more types may be used in combination.

Any organic solvent can be used without any particular limitation. Examples of organic solvents include propylene glycol, ethylene glycol, 1,2-butanediol, propylene glycol monobutyl ether, dipropylene glycol monopropyl ether, triethylene glycol monobutyl ether, 1,2-hexanediol, 1,6-hexanediol, and the like, but glycol ethers having a propylene oxide group are preferred. Examples of other organic solvents include alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, and the like; alkylene glycols where the alkylene group contains 2 to 6 carbon atoms, such as ethylene glycol, propylene glycol, butylene glycol, triethylene glycol, 1,2,6-hexanetriol, thiodiglycol, hexylene glycol, and diethylene glycol; lower alkyl ethers of alkylene glycols such as glycerin, ethylene glycol monomethyl (or ethyl, propyl, butyl) ether, diethylene glycol monomethyl (or ethyl, propyl, butyl) ether, triethylene glycol monomethyl (or ethyl, propyl, butyl, hexyl) ether, tetraethylene glycol monomethyl (or ethyl, propyl, butyl, hexyl) ether, propylene glycol monomethyl (or ethyl, propyl, butyl) ether, dipropylene glycol monomethyl (or ethyl, propyl, butyl) ether, tripropylene glycol monomethyl (or ethyl, propyl, butyl) ether, tetrapropylene glycol monomethyl (or ethyl) ether, and the like; as well as N-methyl-2-pyrrolidone, 2-pyrrolidone, 1,3-dimethyl-2-imidazolidinone and the like.

Regarding the amount of the organic solvent to the total amount of ink, the amount of organic solvent that individually exists as a liquid at 25° C. (also referred to as a "low-solidification-temperature organic solvent") is preferably 10 wt % or less, more preferably 9 wt %.

The water is preferably ion-exchanged water or pure water. The water content in the total amount of ink is, for example, preferably in the range of 15 wt % or more and 95 wt % or less, more preferably in a range of 25 wt % or more and 85 wt % or less. The water content may, for example, be the remainder with regards to other ingredients.

The ink may also contain conventionally known additives as needed. Additives include, for example, surfactants, pH adjusters, viscosity adjusters, surface tension adjusters, preservatives, antifungal agents, leveling agents, antifoaming agents, light stabilizers, antioxidants, nozzle drying inhibitors, polymer components such as emulsions, dyes, and the like. Surfactants may further include cationic surfactants, anionic surfactants, or nonionic surfactants. Commercially available products, for example, may be used as these surfactants. Commercially available products include, for example, "OLFINE (registered trademark) E1010", "OLFINE (registered trademark) E1006", "OLFINE (registered trademark) E1004", "Silface SAG503A", and "Silface SAG002", manufactured by Nissin Chemical Industry Co., Ltd., and the like. The surfactant content in the total amount of ink is, for example, 5 wt % or less, 3 wt % or less, or 0.1 wt % to 2 wt %. Examples of the viscosity adjusting agent include polyvinyl alcohol, cellulose, water-soluble resins, and the like.

The ink can be produced by, for example, uniformly mixing resin microparticles, coloring agents, organic solvent, water, and, if necessary, other additives by a conventionally known method, and then removing insoluble matter with a filter or the like.

[Storage Liquid]

The storage liquid contains a water-soluble polymer, a water-soluble organic solvent, a surfactant, and water.

Any water-soluble polymer can be used without any particular limitation. Examples of water-soluble polymers include polyvinylpyrrolidone and polyethylene glycol. Other water-soluble polymers include polyvinyl alcohols, polyvinylpyrrolidones, polyacrylic acids, styrene-acrylic acid copolymers, and acrylic acid-acrylic acid ester copolymers. A commercially available product may be used as the water-soluble polymer. Commercially available products include Joncryl (registered trademark) manufactured by BASF, Aqualic (registered trademark) manufactured by Nippon Shokubai Co., Ltd., and Aron (registered trademark) manufactured by Toagosei Co., Ltd. The water-soluble polymer preferably contains an aromatic alkyl group or lactam group in the structure. The weight average molecular weight of the water-soluble polymer is preferably within a range of 8,500 to 20,000, more preferably within a range of 9,000 to 15,000.

Any water-soluble organic solvent can be used without any particular limitation. Examples of water-soluble organic solvents include ethylene oxide, propylene glycol, ethylene glycol, 1,2-butanediol, propylene glycol propyl ether, dipropylene glycol monopropyl ether, diethylene glycol monobutyl ether, triethylene glycol monobutyl ether, diethylene glycol monobutyl ether, 1,6-hexanediol, and the like, but glycol ethers having an ethylene oxide group are preferred. Examples of other organic solvents include alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, and the like; alkylene glycols where the alkylene group contains 2 to 6 carbon atoms, such as ethylene glycol, propylene glycol, butylene glycol, triethylene glycol, 1,2,6-hexanetriol, thiodiglycol, hexylene glycol, and diethylene glycol; lower alkyl ethers of alkylene glycols such as glycerin, ethylene glycol monomethyl (or ethyl, propyl, butyl) ether, diethylene glycol monomethyl (or ethyl, propyl, butyl) ether, triethylene glycol monomethyl (or ethyl, propyl, butyl, hexyl) ether, tetraethylene glycol monomethyl (or ethyl, propyl, butyl, hexyl) ether, propylene glycol monomethyl (or ethyl, propyl, butyl) ether, dipropylene glycol monomethyl (or ethyl, propyl, butyl) ether, tripropylene glycol monomethyl (or ethyl, propyl, butyl) ether, tetrapropylene glycol monomethyl (or ethyl) ether, and the like; as well as N-methyl-2-pyrrolidone, 2-pyrrolidone, 1,3-dimethyl-2-imidazolidinone and the like.

The water-soluble organic solvent may be used alone, or in a combination of two or more types. The amount of water-soluble organic solvent in the total amount of maintenance liquid is, for example, preferably in a range of 5 wt % or more and 50 wt % or less, more preferably in a range of 25 wt % or more and 35 wt % or less.

A commercially available product may be used as the surfactant, for example. Examples of commercially available anionic surfactants include Sunnol (registered trademark) manufactured by Lion Corporation, Emal (registered trademark) manufactured by Kao Corporation, Sandet (registered trademark) and Beaulight (registered trademark) manufactured by Sanyo Chemical Industries, Ltd., and the like. One type of anionic surfactant may be used alone, or a combination of two or more types may be used. The amount of anionic surfactant in the total amount of storage liquid is, for example, preferably in a range of 0.01 wt % or more and 10 wt % or less, more preferably in a range of 0.1 wt % or more and 10 wt % or less.

The surfactant included in the storage liquid may be only an anionic surfactant, or may include a cationic surfactant or a nonionic surfactant in addition to the anionic surfactant.

The water is preferably ion-exchanged water or pure water. The amount of water in the total amount of the storage liquid is, for example, 10% to 90% by mass, or 20% to 80% by mass. The water content may, for example, be the remainder with regards to other ingredients.

The storage liquid preferably does not contain a coloring agent, but may contain a coloring agent. If the maintenance liquid contains a coloring agent, the amount is preferably an amount that does not affect the recorded image.

The storage liquid may also contain conventionally known additives as needed. Examples of the additives include wetting agents, pH adjusting agents, viscosity adjusting agents, surface tension adjusting agents, anti-mold agents, and the like. Examples of the viscosity adjusting agent include polyvinyl alcohol, cellulose, water-soluble resins, and the like.

The storage liquid can be prepared by, for example, uniformly mixing a water-soluble polymer, a water-soluble organic solvent, a surfactant, and water by a conventionally known method.

The viscosity of the storage liquid is preferably less than the viscosity of the ink. The viscosity of the ink and storage liquid can be measured by, for example, a cone-plate rotary viscometer.

The operation of the maintenance mechanism 60 will be described below together with the purging process, the cleaning process, the wiping process, and the image recording process. In the present Embodiment, the cleaning liquid is supplied and discharged in conjunction with the above processing.

[Purge Process and Cleaning Process]

The image recording device 100 is in a standby state when the image recording process is not being executed. In the standby state, as illustrated in FIG. 11, the head 38 is positioned at the capped position, the first support mechanism 51 is positioned at the first orientation while supporting the maintenance mechanism 60, and the maintenance mechanism 60 is positioned at the maintenance position. At this time, the cap 62 covers the nozzle surface 50.

In the standby state, the controller 130 executes the purge process at a prescribed timing or upon receiving an external command. The process when the controller 130 receives an external command to execute the purge process while the image recording device 100 is in the standby state will be described below.

In the purge process, the controller 130 drives the suction pump 74 with the purge shutoff valve 188 and the bypass valve 189 open, and the supply valve 187, the atmospheric release valve 190, and the cap cleaning valve 72 closed. As a result, the ink inside the nozzle 38A is suctioned out and the ink is discharged from the internal spaces 67A, 67B, 67C of the cap 62 through the discharge channels 21A, 21B, 21C, through the first waste liquid tube 178, the second waste liquid tube 180, and the third waste liquid tube 202, to the waste liquid tank 77. At this time, since the cap cleaning valve 72 is closed, the cleaning liquid is not supplied from the cleaning liquid tank 76 to the caps 62A, 62B, 62C through the second supply tube 177, the third supply tube 179, and the fourth supply tube 201.

The controller 130 executes the cleaning process at a prescribed timing, or when an external command has been received. The process when the controller 130 executes the cleaning process, after the purge process is performed and while the image recording device 100 is in the standby state will be described below.

In the cleaning process, the controller 130 drives the suction pump 74 with the cap cleaning valve 72 open and the supply valve 187, purge shutoff valve 188, bypass valve 189, and atmospheric release valve 190 closed. As a result, the cleaning liquid is supplied from the cleaning liquid tank 76 through the second supply tube 177, the third supply tube 179, and the fourth supply tube 201 to the internal spaces of the caps 62A, 62B, and 62C. Since the purge shutoff valve 188 and the bypass valve 189 are closed, no ink is discharged from the nozzle 38A of the head 38 into the internal spaces of the caps 62A, 62B, 62C.

Next, the controller 130 moves the head 38 to the uncapping position, and drives the suction pump 74 with the cap cleaning valve 72 closed. As a result, the cleaning liquid is discharged from the internal spaces 67A, 67B, 67C of the cap 62 through the discharge channels 21A, 21B, 21C, through the first waste liquid tube 178, the second waste liquid tube 180, and the third waste liquid tube 202, to the waste liquid tank 77. As a result, ink remaining in the internal spaces 67A, 67B, 67C of the cap 62, the discharge channels 21A, 21B, 21C, the first waste liquid tube 178, the second waste liquid tube 180, and the third waste liquid tube 202 is washed away by the cleaning liquid.

Furthermore, the image recording device 100 is in a standby state when the image recording process is not being executed, but when entering standby state, the controller 130 executes the cleaning liquid supplying process by driving the suction pump 74 in a condition where the cap cleaning valve 72 is open, but the supply valve 187, purge shutoff valve 188, bypass valve 189 and the atmospheric release valve 190 are closed. As a result, in the cleaning liquid supplying process, the cleaning liquid is supplied from the cleaning liquid tank 76 through the second supply tube 177, the third supply tube 179, and the fourth supply tube 201 to the internal spaces of the caps 62A, 62B, and 62C. Since the purge shutoff valve 188 and the bypass valve 189 are closed, no ink is discharged from the nozzle 38A of the head 38 into the internal spaces of the caps 62A, 62B, 62C.

[Wiping Process]

The controller 130 executes the wiping process with the sponge wipers 64A, 64B, and 64C impregnated with the cleaning liquid. The wiping process is described below.

In the wiping process, the controller 130 drives the return pump 75. As a result, the cleaning liquid is supplied from the cleaning liquid tank 76 to the support base 61 through the first supply tube 175. The cleaning liquid supplied to the support base 61 flows into the first channel 153A in the liquid channel 153 through the inflow port 171. The cleaning liquid that has flowed into the first channel 153A flows through the intermediate channel 153B and the second channel 153C in order, and is discharged from the outflow port 174. At this time, the sponge wipers 64A, 64B, and 64C are impregnated with the cleaning liquid, and the sponge wipers 64A, 64B, and 64C are in a state of containing sufficient cleaning liquid. The cleaning liquid supplied to the liquid channel 153 is returned to the cleaning liquid tank 76.

The controller 130 moves the head 38 downward from the uncapping position indicated by the dashed line to the wiping position indicated by the solid line in FIG. 12.

The maintenance mechanism 60 at the maintenance position is supported by the first support mechanism 51, and at this time, the rack 154 is meshed with the gear 105. When the first motor 55 is driven in this state and the gear 106 rotates clockwise in FIG. 11, the gear 105 rotates counterclockwise in FIG. 11. As a result, the maintenance mechanism 60 at the maintenance position moves forward (downstream in the transport direction 8A) along the front-to-back direction 8 (transport direction 8A) and reaches the wiping position (see FIG. 12).

In the process of moving the maintenance mechanism 60 from the maintenance position to the wiping position, the tip end parts (upper end part) of the sponge wiper 64 and the rubber wiper 63 contact the nozzle surface 50 and slide against the nozzle surface 50 of the ejecting module 49. Specifically, the sponge wipers 64A, 64B, 64C and the rubber wipers 63A, 63B, 63C slide in contact with the nozzle surfaces 50 of the ejecting modules 49A, 49B, 49C. As a result, the nozzle surfaces 50 of the ejecting modules 49A, 49B, 49C are wiped by the sponge wipers 64A, 64B, 64C and then wiped by the rubber wipers 63A, 63B, 63C. As a result, foreign substances and the like attached to the nozzle surface 50 and the nozzle 38A opened in the nozzle surface 50 are removed.

When the maintenance mechanism 60 is at the wiping position, the first motor 55 is driven to rotate the gear 106 counterclockwise in FIG. 12, which causes the gear 105 to rotate clockwise in FIG. 12. As a result, the maintenance mechanism 60 at the wiping position moves back (upstream in the transport direction 8A) and reaches the maintenance position (see FIG. 11).

The controller 130 drives the shaft motor 59 to change the orientation of the first support mechanism 51 from the first orientation to the second orientation (see FIG. 13).

[Movement of Maintenance Mechanism 60]

As illustrated in FIGS. 13 and 14, the maintenance mechanism 60 can move to the standby position along the sloping direction 6 by sliding and moving with regard to the first support mechanism 51 in the second orientation and the second support mechanism 52 while being supported by the first support mechanism 51 and the second support mechanism 52. In other words, the first support mechanism 51 and the second support mechanism 52 can support the maintenance mechanism 60 at the maintenance position, the standby position, and at a position between these two positions.

Specifically, the controller 130 first drives the first motor 55. Therefore, the gear 106 rotates in the clockwise direction in FIG. 19, so the gear 105 rotates counterclockwise, and the maintenance mechanism 60 at the maintenance position moves in the forward sloping direction 5 and is received on the second support mechanism 52.

The controller 130 drives the second motor 56. Therefore, the gear 120 rotates in the clockwise direction in FIG. 20, so gears 118 and 119 rotate counterclockwise, and the maintenance mechanism 60 that has slid from the first support mechanism 51 arrives at the standby position on the second support mechanism 52 (see FIG. 14).

The controller 130 drives the vertical drive motor 163. As a result, the screw shaft 161 rotates, so the second support mechanism 52 moves from the standby position upward along the orthogonal direction 10, and the maintenance mechanism 60 reaches the retracted position. As a result, the lips 66A, 66B, 66C of the caps 62A, 62B, 62C and the rubber wipers 63A, 63B, 63C come into contact with the wiper cleaning mechanism 80.

[Image Recording Process]

The process when an image is recorded on the sheet S (image recording process) will be described below.

When the controller 130 receives a command to record an image on the sheet S from an external device such as the operating panel 44 or an information processing device connected to the image recording device 100 via a LAN or the like, the controller 130 moves the maintenance mechanism 60 as described above from the maintenance position to the standby position. The controller 130 then drives the vertical drive motor 163 to move the maintenance mechanism 60 from the standby position to the retracted position. The controller 130 drives the shaft motor 59 to change the position of the first support mechanism 51 from the second orientation to the first orientation.

The controller 130 then moves the head 38 downward from the capped position to the recording position. Furthermore, the sheet S begins to move, and the ink is ejected from the nozzles 38A while the sheet S is positioned directly below the head 38. Thus, an image is recorded on the sheet S. The ink that has adhered to the sheet S is fixed to the sheet S by being heated when passing through the heater 39.

Furthermore, after the CIS 25 checks the recorded image, the transported sheet S is cut into a prescribed size by the cutter unit 26, and discharged.

After the image recording process on the sheet S, a process that is the reverse of that described above is performed when the maintenance mechanism 60 moves to the maintenance position.

During the image recording process, an ink circulation process is executed to circulate ink between the ink sub-tank 181 and the ejecting module 49. The controller 130 closes the bypass valve 189 and the supply valve 187, and drives the positive pressure pump 191. When the positive pressure pump 191 is driven, ink is supplied from the ink sub-tank 181 to the ejecting module 49 through the channel 183. Ink that has flowed into the manifold 24 from the inflow port 22 of the ejecting module 49 returns to the ink sub-tank 181 through the channel 184 from the outflow port 23. In other words, the ink circulates between the ink sub-tank 181 and the ejecting module 49.

[Storage Process]

The storage process will be described below with reference to FIGS. 15 and 16. The storage process is executed in the image recording device 100 when the user gives instructions to execute the storage process. A case where the user gives instructions to execute the storage process is, for example, when the image recording device 100 is not going to be used for a long period of time. A long period of time is, for example, one month or more, but this is not a limitation.

The image recording device 100 is in a standby state. In the standby state, when the controller 130 receives a storage instruction command based on an input from the operating panel 44, the controller 130 transitions to storage mode, and executes the storage process. When the storage instruction command is received, the controller 130 displays on the display part 44A of the operating panel 44 that the storage mode is set and that the ink tank 34 is not to be removed.

Figure 15:
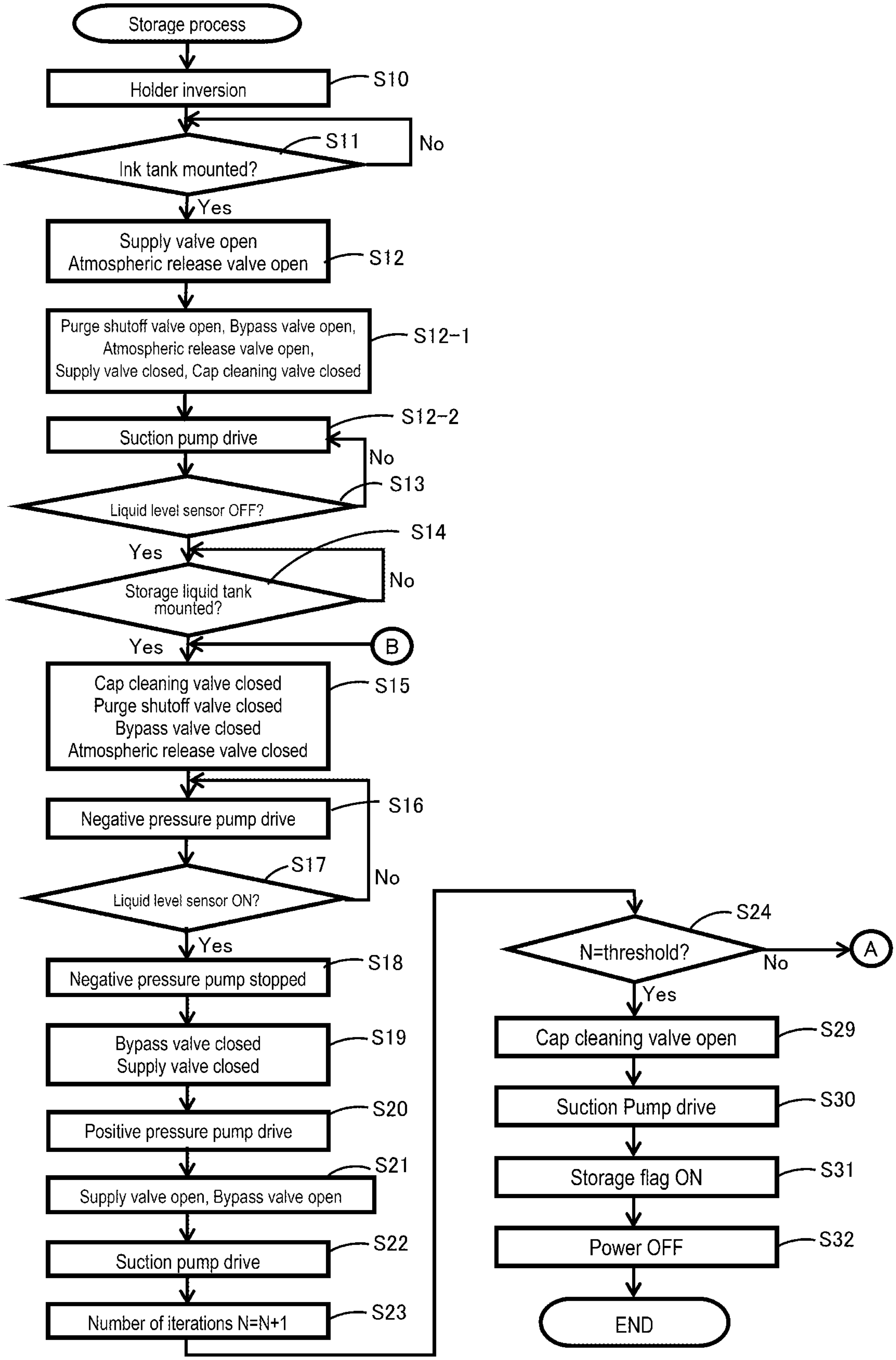
FIG. 15 is a flowchart of the storage process.
Figure 16:
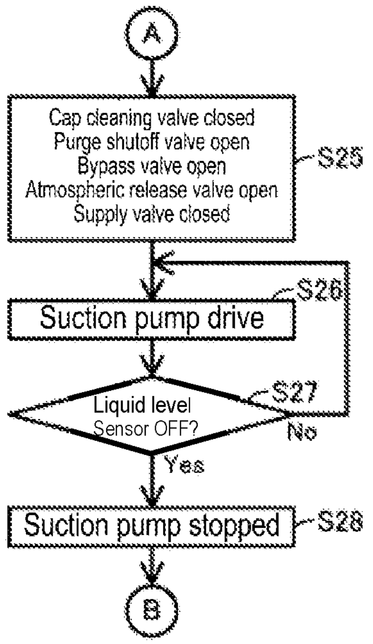
FIG. 16 is a flowchart of the storage process.

As illustrated in FIGS. 15 and 16, the controller 130 drives the transport motor 53 in the opposite direction for a certain period of time to rotate the drive roller 102, the holder 35, and the transport rollers 36A and 40A in the direction opposite to the transport direction 8A. (S10). As a result, the sheet S positioned on the transport path 43 is moved in the direction opposite to the transport direction 8A and is rolled around the roll body 37.

After stopping the transport motor 53, the controller 130 determines whether the ink tank 34 is attached to the mounting case 110 (S11). Specifically, by reading the identification information stored in the recording region of the IC substrate 70 through the contact 114, it is determined whether or not the ink tank 34 is attached to the mounting case 110. If the controller 130 determines that the ink tank 34 is not attached to the mounting case 110 (S11: No), the controller 130 displays instructions on the display part 44A to attach the ink tank 34, and waits until the ink tank 34 is attached.

If the controller 130 determines that the ink tank 34 is attached to the mounting case 110 (S11: Yes), the controller 130 opens the supply valve 187 and the atmospheric release valve 190 (S12, an example of the return process). As a result, the ink retained in the ink sub-tank 181 is returned to the ink tank 34 through the channel 182 due to gravity, and no ink is retained in the ink sub-tank 181. It should be noted that the ink in the ink sub-tank 181 does not have to run out completely. For example, the ink below the position where the channel 182 opens into the internal space of the ink sub-tank 181 does not return to the ink tank 34 due to gravity, and a small amount of the ink may remain in the internal space of the ink sub-tank 181.

The controller 130 opens the purge shutoff valve 188, the bypass valve 189, and the atmospheric release valve 190, and closes the supply valve 187 and the cap cleaning valve 72 (S12-1). Then, the controller 130 drives the suction pump 74 for a certain period of time (S12-2, an example of a first discharge process). When the suction pump 74 is driven, the internal space 67 of the cap 62 becomes negative pressure, the ink remained in the channels 183, 184, and 186 is discharged from the ejecting module 49 into the internal space 67 of the cap 62 through the manifold 24 and the nozzle 38A, and further discharged into the waste liquid tank 77 through the channel 178. Since the supply valve 187 is closed, ink retained in the ink tank 34 is not supplied to the ink sub-tank 181. Thus, ink remained in the channels 183, 184, and 186, manifold 24, nozzle 38A, the internal space 67 of the cap 62 is discharged into the waste liquid tank 77 through the channel 178.

When the detection signal of the liquid level sensor 192 of the ink sub-tank 181 is an OFF signal (S13: Yes), the controller 130 provides instructions on the display part 44A to install the storage liquid tank 11 instead of the ink tank 34, and determines whether the storage liquid tank 11 is attached to the mounting case 110 (S14). Specifically, a determination is made as to whether or not the storage liquid tank 11 is attached to the mounting case 110 by reading the identification information stored in the recording region of the IC substrate 12 through the contact 114. If the controller 130 determines that the storage liquid tank 11 is not attached to the mounting case 110 (S14: No), the controller 130 displays instructions on the display part 44A to attach the storage liquid tank 11, and waits until the storage liquid tank 11 is attached.

In response to the determination that the storage liquid tank 11 is attached to the mounting case 110 (S14: Yes), the controller 130 closes the cap cleaning valve 72, the purge shutoff valve 188, the bypass valve 189, and the atmospheric release valve 190 (S15). Next, the controller 130 drives the negative pressure pump 193 (S16, an example of a storage liquid supplying process).

When the negative pressure pump 193 is driven, the internal space of the ink sub-tank 181 becomes negative pressure, and the storage liquid retained in the storage liquid tank 11 is supplied to the ink sub-tank 181 through the channel 182.

If the detection signal of the liquid level sensor 192 of the ink sub-tank 181 is an OFF signal (517: No), the controller 130 continues driving the negative pressure pump 193 (S16). If the detection signal of the liquid level sensor 192 is an ON signal (517: Yes), the controller 130 stops driving the negative pressure pump 193 (S18). If the liquid level sensor 192 is an ON signal, the storage liquid is retained up to a prescribed height in the ink sub-tank 181.

Next, the controller 130 closes the bypass valve 189 and the supply valve 187 (S19), and drives the positive pressure pump 191 for a certain period of time (520, an example of a storage liquid circulation process). When the positive pressure pump 191 is driven, storage liquid is supplied from the ink sub-tank 181 to the ejecting module 49 through the channel 183. The storage liquid that has flowed into the manifold 24 from the inflow port 22 of the ejecting module 49 returns to the ink sub-tank 181 through the channel 184 from the outflow port 23. In other words, the storage liquid circulates between the ink sub-tank 181 and the ejecting module 49. Since the inner diameter of the nozzle 38A is small and the internal space 67 of the cap 62 is not under negative pressure, it is difficult for the storage liquid to enter the nozzle 38A from the manifold 24 in the ejecting module 49.

After stopping the positive pressure pump 191, the controller 130 opens the supply valve 187 and the bypass valve 189 (S21). After that, the controller 130 drives the suction pump 74 for a certain period of time (522, an example of the second discharging process). When the suction pump 74 is driven, the internal space 67 of the cap 62 becomes negative pressure, the storage liquid is discharged from the ejecting module 49 into the internal space 67 of the cap 62 through the nozzle 38A, and the storage liquid flows through the channel 178 and is discharged into the waste liquid tank 77. In conjunction, the storage liquid is supplied from the ink sub-tank 181 to the ejecting module 49 through the channels 183 and 184. Furthermore, the storage liquid retained in the storage liquid tank 11 is supplied to the ink sub-tank 181 through the channel 182.

After stopping the suction pump 74, the controller 130 increments the repetition number N by 1 (N=N+1, S23), and determines whether the number of repetitions N is a threshold value (S24). The threshold is preset and stored in the EEPROM 134 of the controller 130, and for example, may be three times.

In response to determining that the number of repetitions N is not at the threshold value (S24: No), the controller 130 closes the cap cleaning valve 72 and the supply valve 187, and opens the purge shutoff valve 188, the bypass valve 189, and the atmospheric release valve 190 (S25). Next, the controller 130 drives the suction pump 74 (S26).

When the suction pump 74 is driven, the internal space 67 of the cap 62 becomes negative pressure, and the storage liquid is discharged from the ejecting module 49 into the internal space 67 of the cap 62 through the nozzle 38A. In conjunction, the storage liquid moves from the ink sub-tank 181 to the ejecting module 49 through the channels 183 and 184, is similarly discharged into the internal space 67 of the cap 62 through the nozzle 38A, and is discharged through the channel 178 into the waste liquid tank 77. Since the cap cleaning valve 72 is closed, the cleaning liquid is not supplied from the cleaning liquid tank 76 to the cap 62.

If the detection signal of the liquid level sensor 192 of the ink sub-tank 181 is not an OFF signal (S27: No), the controller 130 continues driving the suction pump 74 (S26). If the detection signal of the liquid level sensor 192 is an OFF signal (S27: Yes), the controller 130 drives the suction pump 74 for a certain period of time before stopping (S28). If the liquid level sensor 192 outputs an OFF signal, the liquid level of the storage liquid in the ink sub-tank 181 is below a prescribed level, and therefore the suction pump 74 is driven, and thereby the storage liquid retained in the ink sub-tank 181 is mostly discharged to the waste liquid tank 77. Note that since the supply valve 187 is closed, the storage liquid is not supplied from the storage liquid tank 11 to the ink sub-tank 181. The controller 130 then executes steps S15 through S24.

If the controller 130 determines that the number of iterations N is the threshold value (S24: Yes), the number of iterations N is reset, the cap cleaning valve 72 is opened (S29), and the suction pump 74 is driven for a certain period of time (S30, an example of the cleaning process). As a result, the cleaning liquid is supplied from the cleaning liquid tank 76 through the second supply tube 177 to the internal space 67 of the cap 62, and the cleaning liquid is discharged from the internal space 67 through the first waste liquid tube 178 to the waste liquid tank 77.

After stopping the suction pump 74, the controller 130 updates the storage flag stored in the EEPROM 134 to ON (S31), and powers OFF the image recording device 100 (S32). This completes the storage process.

[Resume Process]

Figure 17:
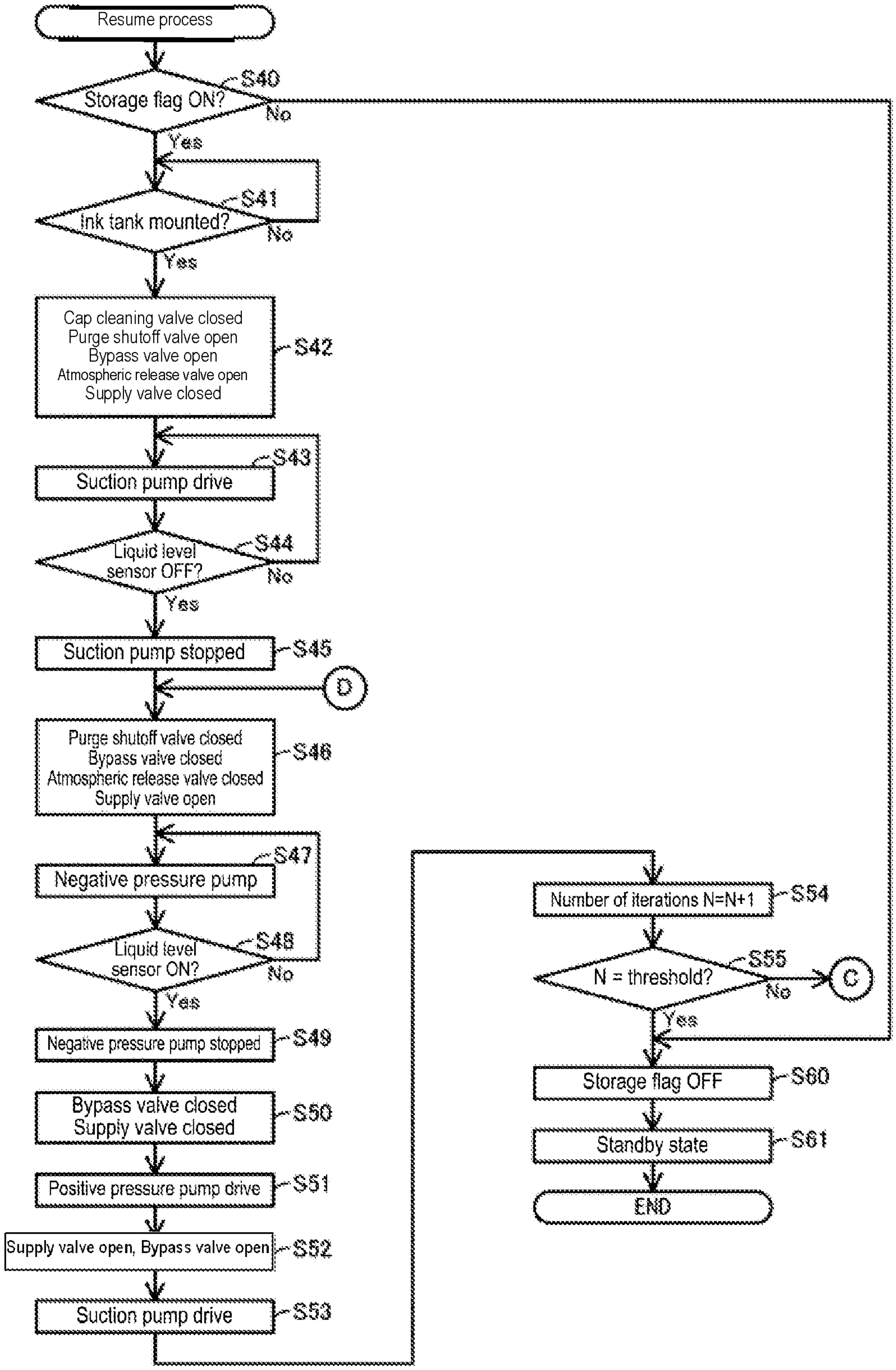
FIG. 17 is a flowchart of the resume process.
Figure 18:
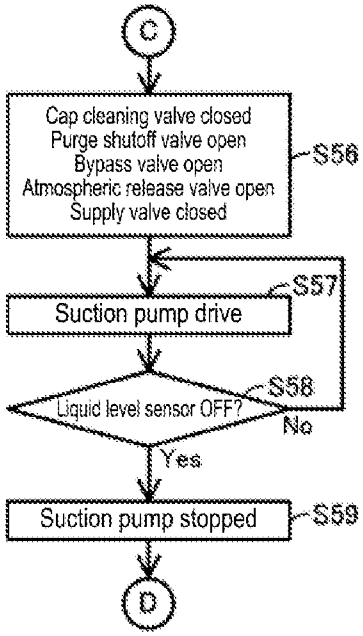
FIG. 18 is a flowchart of the resume process.

The resume process will be described below with reference to FIGS. 17 and 18. The resume process is performed when the user decides to resume use of the image recording device 100 in the storage state, and turns ON the power of the image recording device 100.

The image recording device 100 is in a storage state and a standby state. In the storage state and the standby state, the controller 130 receives the power ON instruction from the user and executes the resume process. The controller 130 displays a message indicating that the ink tank 34 is to be installed on the display part 44A.

As illustrated in FIG. 16, the controller 130 determines whether the storage flag stored in EEPROM 134 is ON (S40). If the controller 130 determines that the storage flag is not ON (S40: No), the controller 130 maintains the standby state (S61).

Upon determining that the storage flag is ON (S40: Yes), the controller 130 determines whether the ink tank 34 is attached to the mounting case 110 (S41). Specifically, by reading the identification information stored in the recording region of the IC substrate 70 through the contact 114, it is determined whether or not the ink tank 34 is attached to the mounting case 110. If the controller 130 determines that the ink tank 34 is not attached to the mounting case 110 (S41: No), the controller 130 displays instructions on the display part 44A to attach the ink tank 34, and waits until the ink tank 34 is attached.

In response to the determination that the ink tank 34 is attached to the mounting case 110 (S41: Yes), the controller 130 opens the purge shutoff valve 188, the bypass valve 189, and the atmospheric release valve 190, and closes the cap cleaning valve 72 and the supply valve 187 (S42). Next, the controller 130 drives the suction pump 74 (S43).

When the suction pump 74 is driven, the internal space 67 of the cap 62 becomes negative pressure, and the storage liquid is discharged from the ejecting module 49 into the internal space 67 of the cap 62 through the nozzle 38A. In conjunction, the storage liquid moves from the ink sub-tank 181 to the ejecting module 49 through the channels 183 and 184, is similarly discharged into the internal space 67 of the cap 62 through the nozzle 38A, and is discharged through the channel 178 into the waste liquid tank 77. Since the cap cleaning valve 72 is closed, the cleaning liquid is not supplied from the cleaning liquid tank 76 to the cap 62. Furthermore, since the supply valve 187 is closed, ink is not supplied from the ink tank 34 to the ink sub-tank 181.

If the detection signal of the liquid level sensor 192 of the ink sub-tank 181 is not an OFF signal (S44: No), the controller 130 continues driving the suction pump 74 (S43). If the detection signal of the liquid level sensor 192 is an OFF signal (S44: Yes), the controller 130 drives the suction pump 74 for a certain period of time before stopping (S45). If the liquid level sensor 192 outputs an OFF signal, the liquid level of the storage liquid in the ink sub-tank 181 is below a prescribed level, and therefore the suction pump 74 is driven, and thereby the storage liquid retained in the ink sub-tank 181 is mostly discharged to the waste liquid tank 77. Note that since the supply valve 187 is closed, ink is not supplied from the ink tank 34 to the ink sub-tank 181.

After stopping the suction pump 74, the controller 130 closes the purge shutoff valve 188, the bypass valve 189, and the atmospheric release valve 190, and opens the supply valve 187 (S46). Next, the controller 130 drives the negative pressure pump 193 (S47).

When the negative pressure pump 193 is driven, the internal space of the ink sub-tank 181 becomes negative pressure, and the ink retained in the ink tank 34 is supplied to the ink sub-tank 181 through the channel 182.

If the detection signal of the liquid level sensor 192 of the ink sub-tank 181 is an OFF signal (S48: No), the controller 130 continues driving the negative pressure pump 193 (S47). If the detection signal of the liquid level sensor 192 is an ON signal (S48: Yes), the controller 130 stops driving the negative pressure pump 193 (S49). If the liquid level sensor 192 is an ON signal, the ink is retained up to a prescribed height in the ink sub-tank 181.

The controller 130 closes the bypass valve 189 and the supply valve 187 (S50), and drives the positive pressure pump 191 for a certain period of time (S51). When the positive pressure pump 191 is driven, ink is supplied from the ink sub-tank 181 to the ejecting module 49 through the channel 183. Ink that has flowed into the manifold 24 from the inflow port 22 of the ejecting module 49 returns to the ink sub-tank 181 through the channel 184 from the outflow port 23. In other words, the ink circulates between the ink sub-tank 181 and the ejecting module 49. Since the inner diameter of the nozzle 38A is small and the internal space 67 of the cap 62 is not under negative pressure, it is difficult for the ink to enter the nozzle 38A from the manifold 24 in the ejecting module 49.

After stopping the positive pressure pump 191, the controller 130 opens the bypass valve 189 (S52). After that, the controller 130 drives the suction pump 74 for a certain period of time (S53). When the suction pump 74 is driven, the internal space 67 of the cap 62 becomes negative pressure, the ink is discharged from the ejecting module 49 into the internal space 67 of the cap 62 through the nozzle 38A, and the ink flows through the channel 178 and is discharged into the waste liquid tank 77. In conjunction, the ink is supplied from the ink sub-tank 181 to the ejecting module 49 through the channels 183 and 184. Furthermore, the ink retained in the storage liquid tank 11 is supplied to the ink sub-tank 181 through the channel 182.

After stopping the suction pump 74, the controller 130 increments the repetition number N by 1 (N=N+1, S54), and determines whether the number of repetitions N is a threshold value (S55). The threshold is preset and stored in the EEPROM 134 of the controller 130, and for example, may be three times.

In response to determining that the number of repetitions N is not at the threshold value (S55: No), the controller 130 closes the cap cleaning valve 72, the atmospheric release valve 190, and the supply valve 187, and opens the purge shutoff valve 188, the bypass valve 189, and the atmospheric release valve 190 (S56). Next, the controller 130 drives the suction pump 74 (S57).

When the suction pump 74 is driven, the internal space 67 of the cap 62 becomes negative pressure, and the ink is discharged from the ejecting module 49 into the internal space 67 of the cap 62 through the nozzle 38A. In conjunction, the ink moves from the ink sub-tank 181 to the ejecting module 49 through the channels 183 and 184, is similarly discharged into the internal space 67 of the cap 62 through the nozzle 38A, and the ink is discharged through the channel 178 into the waste liquid tank 77. Since the cap cleaning valve 72 is closed, the cleaning liquid is not supplied from the cleaning liquid tank 76 to the cap 62.

If the detection signal of the liquid level sensor 192 of the ink sub-tank 181 is not an OFF signal (S58: No), the controller 130 continues driving the suction pump 74 (S57). If the detection signal of the liquid level sensor 192 is an OFF signal (S58: Yes), the controller 130 drives the suction pump 74 for a certain period of time before stopping (S59). If the liquid level sensor 192 outputs an OFF signal, the liquid level of the ink in the ink sub-tank 181 is below a prescribed level, and therefore the suction pump 74 is driven, and thereby the ink retained in the ink sub-tank 181 is mostly discharged to the waste liquid tank 77. Note that since the supply valve 187 is closed, ink is not supplied from the ink tank 34 to the ink sub-tank 181. Next, the controller 130 executes steps S46 to S55.

If the controller 130 determines that the number of repetitions N is at the threshold value (S55: Yes), the controller 130 resets the number of repetitions N, updates the storage flag stored in the EEPROM 134 to OFF (S60), and enters standby state (S61). This completes the resume process.

Action and Effect of the Embodiment

With the aforementioned Embodiment, the ink with excellent fast drying properties on the recording medium has excellent replacement properties for being replaced with the storage liquid, and the redispersibility is excellent when re-dispersing the solid dried ink in the solvent again.

Furthermore, the user can replace the ink in the ejecting module 49 with storage liquid at arbitrary timing. Thereby, the user can place the image recording device 100 in a storage state based on the schedule of use by the user.

In addition, since the ink in the ink sub-tank 181 is returned to the ink tank 34 in the storage process, less ink is discarded during storage. In addition, the ink in the ejecting module 49 and the channels 182, 183, 184 can easily be replaced with the storage liquid.

Furthermore, during the storage process, a process of supplying the storage liquid from the storage liquid tank 11 to the ink sub-tank 181 and a process of circulating the storage liquid between the ejecting modules 49 and the ink sub-tank 181 are executed, and therefore the ink remaining in the ink sub-tank 181, the ejecting module 49, and the channels 183 and 184 is dispersed in the storage liquid.

In the storage process, a process where the storage liquid is discharged from the ejecting module 49, a process where the storage liquid is supplied from the storage liquid tank 11 to the ink sub-tank 181, and a process where the storage liquid is circulated between the ink sub-tank 181 the ejecting module 49, are repeatedly executed and therefore the rate of replacing the ink remaining in the ink sub-tank 181, the ejecting module 49, and the channels 183 and 184 with the storage liquid will increase.

Furthermore, since the storage liquid is not returned from the ink sub-tank 181 to the storage liquid tank 11 in the storage process, and there is no way for the storage liquid that is mixed with the ink from the storage liquid tank to be used in the subsequent storage process.

Modified Examples

In the image recording device 100, the support base 61 is provided with the three caps 62A, 62B, and 62C, but the number of caps 62 is not particularly limited so long as it corresponds to the number of the ejecting modules 49A. For example, the number of caps 62 may be four or more, or two or less. Furthermore, the sponge wiper 64 and the rubber wiper 63 are not essential components.

In the image recording device 100, the maintenance mechanism 60 moves along the front-to-back direction 8, but the movement of the maintenance mechanism 60 is not particularly limited. Furthermore, the ejecting module 49 may move relative to the maintenance mechanism 60.

With the image recording device 100, the ink tank 34 and the storage liquid tank 11 are separate and can be replaced on the mounting case 110, but the ink tank 34 and the storage liquid tank 11 can be configured as one piece, and attached to the mounting case 110.

It should be noted that the storage process and the resume process may be executed on the condition that an input or the like to the image recording device 100 has not been performed for a certain period of time, in addition to being executed based on instructions from a user. In this case, the resume process may be executed on the condition that a print instruction command is accepted, for example. However, when the image recording device 100 is not used for a long period of time, it is assumed that the image recording device 100 will not receive power due to, for example, being unplugged. Furthermore, it is assumed that the controller 130 will also not function due to loss of power. Therefore, it would be convenient if the storage process can be executed based on the convenience of the user.

Further, the positive pressure pump 191 in addition to the suction pump 74 can be driven in the first discharge process and the second discharge process.

In addition, with the above Embodiments, the ink is described as an example of the liquid, but instead of ink, for example, the liquid can be a pretreatment liquid that is ejected onto the paper prior to the ink during printing, or a post-treatment liquid for overcoating ink that has already adhered to the paper. Furthermore, the storage liquid may be used as a cleaning liquid for cleaning the head 38.

EXAMPLES

Examples of the present disclosure are given below.

[Pigment Dispersion A]

Pure water was added to a mixture of 20 wt % of pigment (carbon black) and 7 wt % of a sodium hydroxide neutralized product of a styrene-acrylic acid copolymer (acid value of 175 mg KOH/g, molecular weight of 10,000) to achieve a total of 100 wt %, and then the mixture was stirred to obtain a mixture. The mixture was placed in a wet sand mill filled with 0.3 mm diameter zirconia beads and dispersed for 6 hours. Afterwards, the zirconia beads were removed by a separator and filtered through a 3.0 lam pore diameter cellulose acetate filter to obtain pigment dispersion A. Note that the styrene-acrylic acid copolymer is a water-soluble polymer that is generally used as a pigment dispersing agent.

Example 1: Water-Based Ink

Pigment dispersion liquid A contains carbon black having the pigment solid content of 5 wt %, 10.0 wt % of Mowinyl 6899D (Tg=49° C., 46 wt %) as resin microparticles, 5.0 wt % of 1,2-hexanediol (liquid at 25° C.) and 2.0 wt % of dipropylene glycol monopropyl ether (liquid at 25° C.) as organic solvents, 2.0 wt % of Silface SAG503A as a surfactant, and deionized water as the remainder. This was used as water-based ink.

Example 2: Water-Based Ink

The same composition as in Example 1 was prepared, except that 7.0 wt % of 1,2-hexanediol (liquid at 25° C.) and 3.0 wt % of dipropylene glycol monopropyl ether (liquid at 25° C.) were used as the organic solvents.

Example 3: Water-Based Ink

The same composition as in Example 1 was prepared, except that 8.0 wt % of 1,2-hexanediol (liquid at 25° C.) and 3.0 wt % of dipropylene glycol monopropyl ether (liquid at 25° C.) were used as the organic solvents.

Example 4: Water-Based Ink

The same composition as in Example 1 was prepared, except that 5.0 wt % of 1,2-hexanediol (liquid at 25° C.) and 2.0 wt % of propylene glycol monobutyl ether (liquid at 25° C.) were used as the organic solvents.

Example 5: Water-Based Ink

The same composition as in Example 1 was prepared, except that 5.0 wt % of 1,2-hexanediol (liquid at 25° C.) and 2.0 wt % of triethylene glycol monobutyl ether (liquid at 25° C.) were used as the organic solvents.

Example 6: Water-Based Ink

The composition was the same as in Example 1 except that 11.0 wt % of Mowinyl 6969D (Tg=71° C., 42 wt %) was used as the resin microparticles.

Example 7: Water-Based Ink

The composition was the same as in Example 1 except that 15.3 wt % of Superflex 820 (Tg=46° C., 30 wt %) was used as the resin microparticles.

Example 8: Water-Based Ink

The same composition as in Example 1 was prepared, except that 7.0 wt % of 1,2-hexanediol (liquid at 25° C.), 1.0 wt % of 1,6-hexanediol (solid at 25° C.), and 3.0 wt % of dipropylene glycol monopropyl ether (liquid at 25° C.) were used as the organic solvents.

Example 11: Storage Liquid

A solution of 0.2 wt % of polyvinylpyrrolidone (PVP, weight average molecular weight 10,000) as a water-soluble polymer, 40.0 wt % of glycerin as a wetting agent, 5.0 wt % of triethylene glycol monobutyl ether as an organic solvent, 3.0 wt % of Sunnol NL-1430 (28 wt %) as a surfactant, and deionized water as the remainder was used as the storage liquid.

Example 12: Storage Liquid

The composition was the same as in Example 11 except that 0.6 wt % of Joncryl 62 (weight average molecular weight 8,500, 34 wt %) was used as the water-soluble polymer.

Example 13: Storage Liquid

The composition was the same as in Example 11 except that 0.2 wt % of polyethylene glycol 20000 (weight average molecular weight: 20,000) was used as the water-soluble polymer.

Example 14: Storage Liquid

The composition was the same as in Example 11 except that 0.4 wt % of Joncryl 57 (weight average molecular weight 4900, 45 wt %) was used as the water-soluble polymer.

Example 15: Storage Liquid

The composition was the same as in Example 11 except that 0.2 wt % of polyethylene glycol 35000 (weight average molecular weight: 35,000) was used as the water-soluble polymer.

Example 16: Storage Liquid

The composition was the same as in Example 11 except that 5.0 wt % of diethylene glycol monobutyl ether was used as the organic solvent.

Example 17: Storage Liquid

The composition was the same as in Example 11 except that 5.0 wt % of dipropylene glycol monopropyl ether was used as the organic solvent.

Example 18: Storage Liquid

The composition was the same as in Example 11, except that 3.0 wt % of Olfine E1010 was used as a surfactant.

Comparative Example 1: Water-Based Ink

Pigment dispersion liquid A containing carbon black having a content of 5 wt % as the pigment solid content, no resin microparticles, 5.0 wt % of 1,2-hexanediol (liquid at 25° C.) and 2.0 wt % of dipropylene glycol monopropyl ether (liquid at 25° C.) as organic solvents, 2.0 wt % of Silface SAG002 as a surfactant, and deionized water as the remainder was used as a water-based ink.

Comparative Example 2: Water-Based Ink

A pigment dispersion A containing carbon black having the pigment solid content of 5 wt %, 10.0 wt % of Mowinyl 6899D (Tg=49° C.) as the resin microparticles, no organic solvent, 2.0 wt % of Silface SAG002 as a surfactant, and deionized water as the remainder was used as a water-based ink.

Comparative Example 11: Storage Liquid

The storage liquid did not contain a water-soluble polymer, but did contain 40.0 wt % of glycerin as a wetting agent, 5.0 wt % of triethylene glycol monobutyl ether as an organic solvent, and 3.0 wt % of Sunnol NL-1430 as a surfactant, and deionized water as the remainder.

Comparative Example 12: Storage Liquid

A solution of 0.2 wt % of polyvinylpyrrolidone (PVP, weight average molecular weight 10,000) as a water-soluble polymer, 40.0 wt % of glycerin as a wetting agent, 5.0 wt % of triethylene glycol monobutyl ether as an organic solvent, no surfactant, and deionized water as the remainder was used as the storage liquid.

[Print Method]

A water-based ink film was formed on a coated paper by ejecting the water-based ink onto a coated paper using the image recording device 100 and heating with a heater.

[Rapid Drying Test]

The coated paper on which the water-based ink film was formed was rubbed with a cotton swab, and the stain was visually evaluated according to the following evaluation criteria.

A: No stain when rubbed immediately after heating
B: No stain when rubbed 2 seconds after heating
C: No stain when rubbed 5 seconds after heating
D: Staining occurred when rubbed 10 seconds after heating.

[Redispersibility Test]

The water-based ink and the storage liquid were mixed at a ratio of 10:90 or 5:95, and 12 μL of the mixture was dropped onto a flat plate made of polypropylene and left for 7 days in an environment at a temperature of 60° C. and 30% humidity. After allowing to sit, 20 mL of pure water was added drop wise to the condensed mixed liquid, and after manual vibration was applied, a visual judgment was made according to the following evaluation criteria.

A: No dry solid in the liquid when observed with an optical microscope with a magnification of 200 times
B: No dry solids in the liquid during visual observation
C: 50% or more of the total dry solids are dispersed in the liquid after pure water is added by drops, based on visual observation.
D: Less than 50% of the total dry solids are dispersed in the liquid after pure water is added by drops, based on visual observation.

[Replacement Test]

The ink tank 34 was attached to the image recording device 100 and image recording was performed. In the image recording device 100, a storage process (repeated once) was executed using a storage liquid, and the replacement rate of the liquid in the ink sub-tank 181 after execution was measured. The replacement rate was determined by measuring the absorbance (500 nm) of the liquid after replacement, using an absorptiometer (Shimadzu Corporation, UV-3600), and the ratio to the absorbance of the aqueous ink alone (1−absorbance of the liquid after replacement/absorbance of only water-based ink) was calculated.

A: The substitution rate was 90% or more
B: The substitution rate was less than 90% and 80% or more

[Results of Quick-Drying Test]

Table 1 shows the quick-drying test results of Examples 1 to 8 and Comparative Examples 1 and 2. As illustrated in Table 1, the evaluations of Comparative Examples 1 and 2 were D, whereas the evaluation of Examples 1 to 8 were A to C, indicating that the quick-drying properties of the water-based inks of Examples 1 to 8 are excellent. Acrylic resin microparticles contained in water-based ink are superior for quick-drying properties, have favorable storage stability, and have high abrasion resistance due to the high hardness of the film, as compared with other resin microparticles such as urethane resin microparticles.

Furthermore, Examples 1 to 4 and 6 to 8 containing glycol ether having a propylene oxide group as the organic solvent were superior for quick-drying properties as compared to Example 5, in which the organic solvent did not contain a glycol ether having a propylene oxide group. Glycol ether having a propylene oxide group contained in a water-based ink is considered to be excellent for quick-drying properties because it has a film-enhancing effect on the resin microparticles. Furthermore, Examples 1, 2, 4, and 6 to 8, in which the ratio of organic solvent that is liquid at 25° C. to the total amount of solvent was 10% or less, were particularly excellent for quick-drying properties. Water-based ink with a large liquid component will require a lot of time to lose fluidity when adhered to a paper surface and this is considered to be why quick drying properties thereof are inferior.

TABLE 1

| | | Example | | | | | | | | Comparative Example | |
|---|---|---|---|---|---|---|---|---|---|---|---|
| | | 1 | 2 | 3 | 4 | 5 | 6 | 7 | 8 | 1 | 2 |
| Pigment | Carbon black | 5.0 | 5.0 | 5.0 | 5.0 | 5.0 | 5.0 | 5.0 | 5.0 | 5.0 | 5.0 |
| Resin microparticles (wt %) | Mowinyl 6899D (Tg-49° C., 46 wt %) | 10.0 | 10.0 | 10.0 | 10.0 | 10.0 | — | — | 10.0 | — | 10.0 |
| | Mowinyl 6969D (Tg-71° C., 42 wt %) | — | — | — | — | — | 11.0 | — | — | — | — |
| | Superflex 820 (Tg-46° C., 30 wt %) | — | — | — | — | — | — | 15.3 | — | — | — |
| Organic solvent (wt %) | 1,2-hexanediol (liquid at 25° C.) | 5.0 | 7.0 | 8.0 | 5.0 | 5.0 | 5.0 | 5.0 | 7.0 | 5.0 | — |
| | 1,6-hexanediol (solid at 25° C.) | — | — | — | — | — | — | — | 1.0 | | — |
| | Dipropylene glycol monopropyl ether (liquid at 25° C.) | 2.0 | 3.0 | 3.0 | — | — | 2.0 | 2.0 | 3.0 | 2.0 | — |
| | Propylene glycol monobutyl ether (liquid at 25° C.) | — | — | — | 2.0 | — | — | — | — | — | — |
| | Triethylene glycol monobutyl ether (liquid at 25° C.) | — | — | — | — | 2.0 | — | — | — | — | — |
| Surfactant (wt %) | Silface SAG503A | 2.0 | 2.0 | 2.0 | 2.0 | 2.0 | 2.0 | 2.0 | 2.0 | 2.0 | 2.0 |
| | Olfine E1004 | — | — | — | — | — | — | — | — | — | — |
| Solvent (wt %) | Water Rem: Remainder | Rem | Rem | Rem | Rem | Rem | Rem | Rem | Rem | Rem | Rem |
| Total amount | | 100 | 100 | 100 | 100 | 100 | 100 | 100 | 100 | 100 | 100 |
| Viscosity (mPa•s) | | 4.6 | 5.0 | 5.3 | 4.4 | 4.1 | 4.5 | 4.5 | 5.0 | 3.5 | 3.9 |
| Organic solvent liquid at 25° C./total amount (%) | | 7.0 | 10.0 | 11.0 | 7.0 | 7.0 | 7.0 | 7.0 | 10.0 | 7.0 | 0.0 |
| Rapid drying test | | A | A | B | A | C | A | A | A | D | D |

[Results of Redispersion Test]

The compositions and viscosities of Examples 11-18 and Comparative Examples 3-4 are shown in Table 2. The redispersion test results and the replaceability test results are shown in Table 3. Regarding the redispersibility of the water-based ink of Example 1, Comparative Examples 11 to 12 were evaluated as D, whereas the redispersibility of Examples 11 to 18 was evaluated as A to C, so it can be seen that the redispersibility of the storage liquid in Examples 11 to 18 was excellent. Furthermore, even when the storage liquid of Example 11 was used for the water-based inks of Examples 4, 5, and 7, the evaluation was excellent at A to C. Furthermore, Examples 11 to 17 containing the anionic surfactant Sunnol NL-1430 were superior when compared to Example 18 containing the nonionic surfactant Olfine E1010. When redispersing the dry solids, which are solidified mixtures of the remaining water-based ink and storage liquid in the channel or head in water, it is thought that the charged surfactant adsorbs to the particles of the dry solids, and the mutual repulsive force between particles in water is increased, so the dry solids are easily redispersed.

Furthermore, Examples 11 to 13 containing water-soluble polymers with weight average molecular weights of 8,500 to 20,000 were superior to Examples 14 and containing water-soluble polymers with weight average molecular weights outside the range of 8,500 to 20,000. When the mixed liquid of the remaining water-based ink and storage liquid dries in the channel or head, the distance between the pigment particles in the water-based ink is reduced as the amount of solvent decreases. Since the water-soluble polymer acts as a steric hindrance between the pigment particles getting closer together, it is believed that the redispersibility is improved. In addition, water-soluble polymers with bulky structures such as aromatics and lactams are thought to function more readily as steric hindrances. In addition, if the molecular weight of the water-soluble polymer is small, it becomes difficult to function as a steric hindrance while on the other hand, if the molecular weight is large, redissolving in solvent after drying is considered to be more difficult.

Furthermore, Examples 11 to 16 and 18 containing glycol ether having an ethylene oxide group as the organic solvent were superior for redispersibility properties as compared to Example 17, in which the organic solvent did not contain a glycol ether having an ethylene oxide group. Since organic solvents containing glycol ethers with ethylene oxide groups are highly water-soluble, it is thought that they play a role as aids for redissolving or redispersing highly hydrophobic substances such as dry solids, pigments, and resin microparticles in water.

TABLE 2

| | | Example | | | | | | | | Comparative Example | |
|---|---|---|---|---|---|---|---|---|---|---|---|
| | | 11 | 12 | 13 | 14 | 15 | 16 | 17 | 18 | 3 | 4 |
| Water soluble polymer (wt %) | Polyvinyl-pyrrolidone (molecular weight 10,000) | 0.2 | — | — | — | — | 0.2 | 0.2 | 0.2 | — | 0.2 |
| | Joncryl 62 (molecular weight 8,500, 34 wt %) | — | 0.6 | — | — | — | — | — | — | — | — |
| | Polyethylene glycol 20,000 (molecular weight: 20,000) | — | — | 0.2 | — | — | — | — | — | — | — |
| | Joncryl 57 (molecular weight 4,900, 45 wt %) | — | — | — | 0.4 | — | — | — | — | — | — |
| | Polyethylene glycol 35,000 (molecular weight: 35,000) | — | — | — | | 0.2 | — | — | — | — | — |
| Wetting agent (wt %) | Glycerin | 40.0 | 40.0 | 40.0 | 40.0 | 40.0 | 40.0 | 40.0 | 40.0 | 40.0 | 40.0 |
| Organic solvent (wt %) | Triethylene glycol monobutyl ether | 5.0 | 5.0 | 5.0 | 5.0 | 5.0 | — | — | 5.0 | 5.0 | 5.0 |
| | Diethylene glycol monobutyl ether | — | — | — | — | — | 5.0 | — | — | — | — |
| | Dipropylene glycol monopropyl ether | — | — | — | — | — | — | 5.0 | — | — | — |
| Surfactant (wt %) | Sunnol NL-1430 (28 wt %) | 3.0 | 3.0 | 3.0 | 3.0 | 3.0 | 3.0 | 3.0 | — | 3.0 | — |
| | Olfine E1010 | — | — | — | — | — | — | — | 3.0 | — | — |
| Solvent (wt %) | Water Rem: Remainder | Rem | Rem | Rem | Rem | Rem | Rem | Rem | Rem | Rem | Rem |
| Total amount | | 100 | 100 | 100 | 100 | 100 | 100 | 100 | 100 | 100 | 100 |
| Viscosity (mPa•s) | | 4.0 | 3.6 | 4.4 | 3.4 | 5.8 | 3.8 | 3.9 | 3.8 | 3.8 | 3.4 |

TABLE 3

| Water-based ink | Example 1 | Example 1 | Example 1 | Example 1 | Example 1 | Example 1 | Example 1 | Example 1 |
|---|---|---|---|---|---|---|---|---|
| Storage liquid | Example 11 | Example 12 | Example 13 | Example 14 | Example 15 | Example 16 | Example 17 | Example 18 |

TABLE 3-continued

| | | | | | | | | | |
|---|---|---|---|---|---|---|---|---|---|
| Redispersibility | Ratio 90% | A | A | B | B | B | A | C | C |
| | Ratio 95% | A | A | A | B | B | A | C | B |
| Replaceability | | A | A | A | A | B | A | A | A |

| | | | | | | |
|---|---|---|---|---|---|---|
| Water-based ink | | Example 4 | Example 5 | Example 7 | Example 1 | Example 1 |
| Storage liquid | | Example 11 | Example 11 | Example 11 | Comparative Example 3 | Comparative Example 4 |
| Redispersibility | Ratio 90% | A | C | C | D | D |
| | Ratio 95% | A | B | B | D | D |
| Replaceability | | A | A | A | A | A |

[Replacement Test]

As illustrated in Table 3, both the storage liquids of Examples 11 to 18 and the storage liquids of Comparative Examples 3 and 4 were excellent as replacements for the water-based ink of Example 1. However, the replaceability of the storage liquid of Example 15, which has a viscosity higher than that of the water-based ink of Example 1, was evaluated as B, which was inferior to the other Examples and Comparative Examples. It is thought that when liquids with different viscosities (water-based ink and storage liquid) come into contact with each other, the low-viscosity liquid moves into the high-viscosity liquid and mixes. When the water-based ink is replaced with the storage liquid, if the water-based ink remains in the channel or in the intricate parts of the head, the remaining water-based ink may solidify. Therefore, since it is desired that the water-based ink is replaced with the storage liquid even in the inside of the channel and the intricate parts inside the head, it is thought that the replacement performance is improved when the viscosity of the storage liquid is lower than the viscosity of the water-based ink. Furthermore, a lower viscosity of the storage liquid facilitates the water-based ink in the channel downstream of the cap 62 flowing into the waste liquid tank 77.

Obviously, numerous modifications and variations of the present invention(s) are possible in light of the above teachings. It is therefore to be understood that within the scope of the appended claims, the invention(s) may be practiced otherwise than as specifically described herein.

The invention claimed is:

1. A liquid discharging device, comprising:

a cartridge mounting part configured to have a cartridge retaining a liquid mounted thereon;

a tank configured to retain the liquid;

a head configured to eject the liquid from a nozzle which is an opening provided on a nozzle surface of the head;

a first channel connecting the cartridge mounting part and the tank;

a second channel connecting the tank and the head;

a discharge unit comprising a cap configured to cover the nozzle surface, the discharge unit being configured to discharge the liquid from the nozzle by creating a negative pressure in an internal space of the cap; and a controller, wherein the liquid is at least a storage liquid, a first liquid which is different from the storage liquid, or a mixture thereof, the cartridge comprises a first liquid cartridge which retains the first liquid and a storage liquid cartridge which retains the storage liquid, and in a state where the liquid discharging device is in a storage mode, the controller executes:

a return process in which the first liquid is returned from the tank through the first channel to the first liquid cartridge mounted on the cartridge mounting part;

a first discharging process in which the first liquid is discharged from the head after executing the return process by an operation of the discharge unit;

a storage liquid supplying process in which the storage liquid is supplied from a storage liquid cartridge to the tank in a state where the storage liquid cartridge is mounted on the cartridge mounting part; and a second discharging process in which the storage liquid is discharged from the head after executing the storage liquid supplying process by an operation of the discharge unit.

2. The liquid discharging device according to claim 1, wherein the controller further cause the liquid discharging device to transition to the storage mode based on a predetermined instruction command received while the first liquid cartridge is mounted on the cartridge mounting part.

3. The liquid discharging device according to claim 1, wherein:

the first liquid comprises a coloring agent, an organic solvent, a surfactant, and water; and the storage liquid comprises an organic solvent, a surfactant, and water.

4. The liquid discharging device according to claim 3, wherein:

the first liquid further comprises a resin microparticle, and the coloring agent comprises a pigment; and the storage liquid further comprises a water-soluble polymer.

5. The liquid discharging device according to claim 3, wherein a viscosity of the first liquid is higher than a viscosity of the storage liquid.

6. The liquid discharging device according claim 3, wherein the surfactant included in the storage liquid is an anionic surfactant.

7. The liquid discharging device according to claim 3, wherein:

the organic solvent included in the first liquid comprises a glycol ether having a propylene oxide group; and the organic solvent included in the storage liquid comprises a glycol ether having an ethylene oxide group.

8. The liquid discharging device according to claim 3, wherein the organic solvent included in the first liquid comprises a low-solidification-temperature organic solvent which is independently in a liquid state at 25° C., in an amount of 10% by weight or less relative to a total liquid amount.

9. The liquid discharging device according to claim 4, wherein a weight average molecular weight of the water-soluble polymer included in the storage liquid is within a range of 8,500 to 20,000.

10. The liquid discharging device according to claim 4, wherein the water-soluble polymer included in the storage liquid comprises an aromatic alkyl group or a lactam group in a structure thereof.

11. The liquid discharging device according to claim 4, wherein the resin microparticle included in the first liquid is made of an acrylic resin.

12. The liquid discharging device according to claim 1, wherein with the return process, the controller determines whether or not the first liquid cartridge is mounted on the cartridge mounting part based on whether or not identification information is received from the first liquid cartridge.

13. The liquid discharging device according to claim 1, further comprising:

a third channel for discharging liquid from the head to the tank, wherein the controller further executes a storage liquid circulation process in which the storage liquid retained in the tank is circulated through the second channel and the third channel to and from the head before the second discharging process.

14. The liquid discharging device according to claim 13, wherein the controller further executes a first liquid circulation process in which the first liquid retained in the tank is circulated between the tank and the head through the second channel and the third channel, in a state where the first liquid cartridge is mounted on the cartridge mounting part.

15. The liquid discharging device according to claim 13, wherein the controller repeatedly executes the storage liquid circulation process and the second discharging process.

16. The liquid discharging device according to claim 1, wherein the controller further determines whether or not the storage liquid cartridge is mounted on the cartridge mounting part based on whether or not identification information is received from the storage liquid cartridge in the storage liquid supplying process.

17. The liquid discharging device according to claim 1, wherein the discharge unit further comprises a fourth channel communicating with the internal space of the cap, the cap is configured to cover the nozzle surface in a covering position and to separate from the nozzle surface in a retracted position; and the controller further executes a cleaning process in which a cleaning liquid is circulated in the internal space of the cap and in the fourth channel.

18. The liquid discharging device according to claim 1, wherein the controller further causes storage information indicating being in a storage state to be recorded in a memory, and then power of the liquid discharging device to be turned OFF, after executing the second discharging process.

19. The liquid discharging device according to claim 18, wherein the controller causes the storage liquid is discharged from the head by an operation of the discharge unit, in a state where the storage information is recorded in the memory and the first liquid cartridge is mounted on the cartridge mounting part.

20. The liquid discharging device according to claim 19, wherein the controller further causes the first liquid to be supplied from the first liquid cartridge to the tank, in a state where the storage information is recorded in the memory and the first liquid cartridge is mounted on the cartridge mounting part.

* * * * *